(12) United States Patent
Yamada et al.

(10) Patent No.: US 10,550,488 B2
(45) Date of Patent: Feb. 4, 2020

(54) REDUCTION CATALYST, REDUCTION REACTOR AND REDUCTION METHOD

(71) Applicant: KABUSHIKI KAISHA TOSHIBA, Minato-ku (JP)

(72) Inventors: Arisa Yamada, Kawasaki (JP); Satoshi Mikoshiba, Yamato (JP); Akihiko Ono, Kita (JP); Yuki Kudo, Yokohama (JP); Jun Tamura, Chuo (JP); Ryota Kitagawa, Setagaya (JP); Eishi Tsutsumi, Kawasaki (JP); Masakazu Yamagiwa, Yokohama (JP); Yoshitsune Sugano, Kawasaki (JP); Asahi Motoshige, Ota (JP); Tomohito Ide, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 319 days.

(21) Appl. No.: 15/445,646

(22) Filed: Feb. 28, 2017

(65) Prior Publication Data

US 2018/0073154 A1     Mar. 15, 2018

(30) Foreign Application Priority Data

Sep. 12, 2016  (JP) ................................ 2016-177841

(51) Int. Cl.
   *C25B 11/04* (2006.01)
   *C25B 3/04* (2006.01)
   *C25B 9/08* (2006.01)

(52) U.S. Cl.
   CPC ............ *C25B 11/0489* (2013.01); *C25B 3/04* (2013.01); *C25B 9/08* (2013.01)

(58) Field of Classification Search
   None
   See application file for complete search history.

(56) References Cited

U.S. PATENT DOCUMENTS

| 4,381,978 A | 5/1983 | Gratzel et al. |
| 4,439,302 A | 3/1984 | Wrighton et al. |
| 8,444,844 B1 | 5/2013 | Teamey et al. |
| 2008/0073618 A1 | 3/2008 | Inagaki et al. |

(Continued)

FOREIGN PATENT DOCUMENTS

| JP | 9-173840 | 7/1997 |
| JP | 2001-199922 | 7/2001 |

(Continued)

OTHER PUBLICATIONS

Extended European Search Report dated Jun. 29, 2017 in Patent Application No. 17156847.0.

(Continued)

*Primary Examiner* — Kishor Mayekar
(74) *Attorney, Agent, or Firm* — Oblon, McClelland, Maier & Neustadt, L.L.P.

(57) ABSTRACT

The present embodiments provide: a reduction catalyst having high reaction efficiency, a reduction reactor including the same and a reduction method using the same. This catalyst includes a conductor and an organic layer comprises organic modifying groups capable of binding to the surface of the conductor, wherein the organic modifying groups contain a nitrogen-containing heterocycle.

14 Claims, 5 Drawing Sheets

(56) References Cited

U.S. PATENT DOCUMENTS

| | | |
|---|---|---|
| 2010/0187123 A1 | 7/2010 | Bocarsly et al. |
| 2011/0114502 A1 | 5/2011 | Cole et al. |
| 2011/0220484 A1 | 9/2011 | Obenland et al. |
| 2012/0171583 A1* | 7/2012 | Bocarsly ............ H01M 4/8657 429/413 |
| 2016/0076158 A1 | 3/2016 | Tamura et al. |
| 2017/0073827 A1 | 3/2017 | Tamura et al. |

FOREIGN PATENT DOCUMENTS

| | | |
|---|---|---|
| JP | 2011-94194 | 5/2011 |
| JP | 2012-516392 | 7/2012 |
| JP | 2013-193056 | 9/2013 |
| JP | 2013-536319 | 9/2013 |
| JP | 2014-518335 A | 7/2014 |
| JP | 2015-132012 | 7/2015 |
| JP | 2015-535825 | 12/2015 |
| JP | 2016-215141 A | 12/2016 |
| JP | 2017-57491 A | 3/2017 |
| WO | WO 2014/192891 A1 | 12/2014 |

OTHER PUBLICATIONS

Yoshio Hori et al., "Electrocatalytic Process of Co Selectivity in Electrochemical Reduction of $CO_2$ at Metal Electrodes in Aqueous Media," Electrochim. Acta., vol. 39, No. 11/12, 1994, pp. 7.

Yu Sun et al. "Photoelectrochemical Reduction of Carbon Dioxide at Si(111) Electrode Modified by Viologen Molecular Layer with Metal Complex," Chem. Lett. 41, 328330 , doi:10.1246/cl.2012. 328, Feb. 2012, pp. 3.

Steven Y. Reece et al. "Wireless Solar Water Splitting Using Silicon-Based Semiconductors and Earth-Abundant Catalysts," www.sciencemag.org, Science vol. 334, Nov. 2011, pp. 5.

* cited by examiner

US 10,550,488 B2

REDUCTION CATALYST, REDUCTION REACTOR AND REDUCTION METHOD

CROSS REFERENCE TO RELATED APPLICATIONS

This application is based upon and claims the benefit of priority from the prior Japanese Patent Application No. 2016-177841, filed on Sep. 12, 2016, the entire contents of which are incorporated herein by reference.

FIELD

Embodiments of the present invention relate to a reduction catalyst, a reduction reactor and reduction method.

BACKGROUND

From the standpoints of energy problems and environmental issues, it is demanded to efficiently reduce $CO_2$ using light energy as in plants. Plants use a system called "Z-scheme" which excites light energy in two steps. Through photochemical reactions of this system, plants oxidize water ($H_2O$) to obtain electrons and reduce carbon dioxide ($CO_2$), thereby synthesizing cellulose and sugars.

However, known technologies for decomposing $CO_2$ by obtaining electrons from water through artificial photochemical reactions without using any sacrificial reagent all have very low efficiency.

As photochemical reactors, for example, there are known devices which comprise an electrode for oxidation reaction that generates oxygen ($O_2$) by oxidizing $H_2O$ and an electrode for reduction reaction that generates a carbon compound by reducing $CO_2$. In such devices, the electrode for oxidation reaction is provided with an oxidation catalyst for oxidation of $H_2O$ on the surface of a photocatalyst and obtains an electric potential through light energy. The electrode for reduction reaction is provided with a reduction catalyst for reduction of $CO_2$ on the surface of a photocatalyst and is connected with the electrode for oxidation reaction via an electric wire. The electrode for reduction reaction can generate a reduced product by obtaining a $CO_2$ reduction potential from the electrode for oxidation reaction and thereby reducing $CO_2$. In this manner, the use of a Z scheme-type artificial photosynthesis system mimicking plants has been examined for acquisition of an electric potential required for performing $CO_2$ reduction using visible light and a photocatalyst.

Such devices, however, generally have very low solar energy conversion efficiency at about 0.04%. This is believed to be attributed to low energy efficiency of the photocatalyst excited by visible light. Such a very low solar energy conversion efficiency may also be attributed to that the electrode for reduction reaction is connected to the electrode for oxidation reaction via an electric wire and the electricity (electric current) extraction efficiency is thus reduced due to the wire resistance, resulting in a low efficiency.

Moreover, there have been also examined devices in which a silicon solar cell is used for obtaining a reaction potential and a catalyst is provided on both sides of the silicon solar cell to induce a reaction. Such devices may be able to achieve a high solar energy conversion efficiency of about 2.5%. In addition, such devices may take a structure requiring no wiring and can thus be easily increased in size.

In these devices, however, no case of successful $CO_2$ reduction reaction has been known. In order to allow the $CO_2$ reduction reaction to proceed, a further contrivance is necessary since it is required that positively charged ions generated on the side of the oxidation electrode and negatively charged ions generated on the side of the reduction electrode be allowed to migrate to the opposite electrodes. Particularly, for non-use of a sacrificial agent in a redox reaction where $H_2O$ is used as an electron donor, migration of protons (hydrogen ions ($H^+$)) or hydroxide ions ($OH^-$) is indispensable.

In addition, $CO_2$-reducing activities in various metal electrodes have been reported. In the $CO_2$ reduction reaction, electrons and protons react with $CO_2$ and hydrocarbons such as carbon monoxide (CO), formic acid (HCOOH), methanol ($CH_3OH$) and methane ($CH_4$) are produced. The hydrocarbons produced by a reduction reaction vary depending on the number of electrons obtained by the reduction reaction. For instance, carbon monoxide and formic acid are produced by a reaction with two electrons, methanol is produced by a reaction with six electrons, and methane is produced by a reaction with eight electrons. In any of these hydrocarbon-producing reactions, the standard redox potential is substantially the same as that in a reaction of reducing hydrogen ions to produce hydrogen. However, a large overvoltage (excess energy) is actually required for a reduction reaction of a first electron, and this makes the reduction reaction unlikely to proceed. In addition, the larger the number of electrons required in a reduction solution, the more difficult to allow the reduction reaction to proceed with a high Faraday efficiency. In order to perform the $CO_2$ reduction reaction for generating a hydrocarbon(s) of interest in a selective and highly efficient manner, a highly active electrode catalyst is required.

Moreover, there is known a method of performing $CO_2$ reduction reaction using an electrode obtained by fixing a noble metal catalyst on a substrate via organic molecules. More specifically, when Si or the like is used as a material of the substrate, the substrate absorbs light and separates charges to generate electrons. The thus generated electrons are transferred to the noble metal catalyst made of Au or the like through the organic molecules on the substrate, and $CO_2$ is reduced on the noble metal catalyst. Such a method achieves a relatively high reaction efficiency; however, there is a demand for a catalyst with which a higher reaction efficiency is attained.

DETAILED DESCRIPTION

Figure 1:
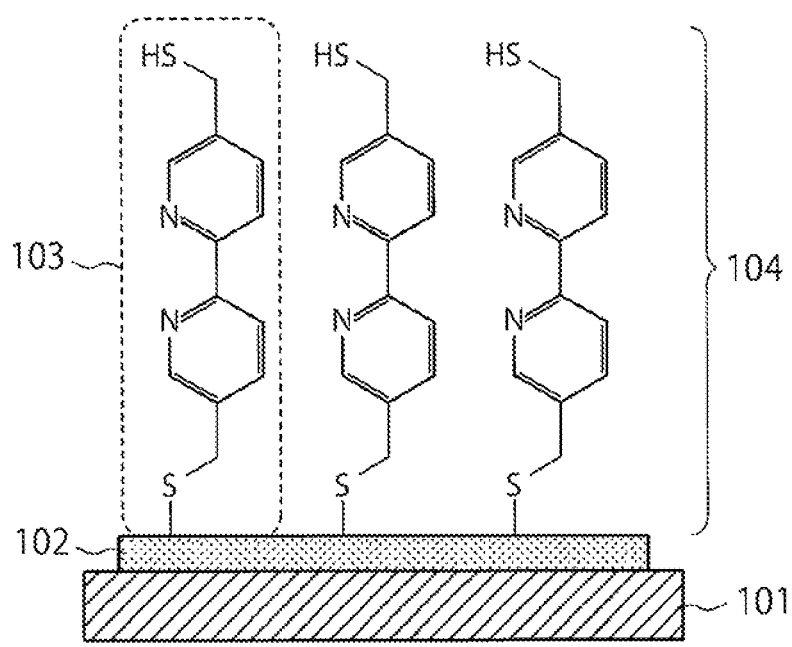
FIG. 1 is a drawing that shows the constitution of the reduction catalyst according to one embodiment.

The reduction catalyst according to the present embodiment comprises: a conductor; and an organic layer comprises organic modifying groups on the surface of the conductor, wherein the organic modifying groups contain a nitrogen-containing heterocycle.

The reduction method according to the present embodiment comprises the steps of:

bringing a reduction electrode comprising the above-described reduction catalyst into contact with an electrolyte solution; and introducing a low-molecular-weight carbon compound to the electrolyte solution so as to reduce the thus introduced low-molecular-weight carbon compound using the above-described electrode.

Further, the reduction reactor according to the present embodiment comprises:

an oxidation electrode;

a reduction electrode comprising the above-described reduction catalyst; and a power supply element connected to the oxidation electrode and the reduction electrode.

These embodiments will now be described referring to the drawings. In the drawings, the same parts are assigned with the same reference symbols. Further, redundant descriptions are made as required.

1. Reduction Catalyst

The reduction catalyst according to a first embodiment will now be described referring to the drawings.

The reduction catalyst according to the first embodiment comprises: a conductive layer 102; and an organic layer 104 on the surface of the conductive layer 102. The conductive layer 102 may be supported on a charge collector 101. The organic layer 104 is constituted by organic modifying groups 103 existing on the conductive layer 102.

The charge collector 101 is, for example, a stainless steel substrate; however, it is not restricted as long as it has electrical conductivity, and can be selected as appropriate taking into consideration the cost, the processability and the like. On the surface of the charge collector 101, the conductive layer 102 constituted by a metal layer or an oxide layer is formed. When the conductive layer 102 is constituted by a metal layer, the conductive layer 102 is constituted by a metal layer containing at least one metal selected from the group consisting of Au, Ag, Cu, Pt, Pd, Zn, Fe, Ti, Sn, In, Hg, Bi and Ni. Meanwhile, when the conductive layer 102 is constituted by an oxide layer, the conductive layer 102 is constituted by an oxide layer containing silver oxide ($Ag_2O$), copper oxide (CuO), tantalum oxide ($Ta_2O_5$), titanium oxide ($TiO_2$), zirconium oxide ($ZrO_2$), aluminum oxide ($Al_2O_3$), silicon oxide ($SiO_2$), zinc oxide (ZnO), tin-doped Indium oxide (ITO), fluorine-doped tin oxide (FTO) or the like. The conductive layer 102 may be an oxide film layer on the surface of a stainless steel substrate. Further, the metal(s) constituting the conductive layer 102 may also serve as the charge collector 101.

The oxide layer is generally an insulator, except for transparent conductive films made of ITO, FTO or the like. In order to ensure conduction by a tunnel current, the thickness of the oxide layer is preferably 10 nm or less, more preferably 5 nm or less.

Further, when the conductive layer is a metal layer, the metal layer can be constituted by metal fine particles. In this case, the metal fine particles themselves may function as a reduction catalyst.

The metal fine particles show high catalytic activity and efficiency when they are nano-fine particles. Therefore, it is preferred that the average particle size of the metal fine particles be, for example, 300 nm or smaller. This is because the activity and efficiency of the metal fine particles are markedly reduced when the average particle size is larger than 300 nm. The average particle size of the metal fine particles is more preferably 1 nm to 150 nm. This upper limit is set considering the above-described activity and efficiency. Meanwhile, the lower limit is set considering the difficulty of the fine particle production process.

As the metal fine particles, fine particles of 50 nm or smaller in average size may be used alone, or aggregates of primary particles comprises these fine particles (secondary particles) may be used as well.

As a method of forming the conductive layer 102 on the surface of the charge collector 101, a known vacuum film-forming method such as sputtering, vapor deposition or ALD (Atomic Layer Deposition) can be employed.

The oxide layer is generally an insulator, except for transparent conductive films made of ITO, FTO or the like. In order to ensure conduction by a tunnel current, the thickness of the oxide layer is preferably 10 nm or less, more preferably 5 nm or less.

The organic layer 104 is, for example, a monolayer film formed by self-assembly of a precursor compound of the organic modifying groups 103, which precursor compound chemically adsorbs to and reacts with the surface of the conductive layer 102. Such bond is formed by binding of a heteroatom of a hetero group contained in the precursor compound to the surface of the conductive layer. Representative examples of the heteroatom forming such a bond include sulfur, oxygen and nitrogen, among which sulfur is preferred. The hetero group is preferably a hydrocarbon group substituted with a thiol group, a disulfide group or a thiocyanate group.

The most preferable thickness of the organic layer 104 is a thickness of monomolecular layer. However, the thickness of the organic layer is influenced by the roughness of the surface, the molecular orientation, and so on. Thus, the thickness of the organic layer is preferably not more than 3 times, more preferably 1 to 2 times of the molecular size of the precursor compound. Furthermore, it is preferred that the organic modifying groups 103 adsorb to the surface of the conductive layer uniformly and densely. However, the density of the organic modifying groups is also influenced by the roughness of the surface, the molecular orientation, and so on. Thus, the density is preferably 0.8 to 2 times of a maximum density calculated from a occupancy area based on the molecular size of the precursor compound.

In the present embodiment, the organic modifying groups contain a nitrogen-containing heterocycle. In FIG. 1, organic modifying groups having a bipyridine skeleton are shown as an example; however, the organic modifying groups are not restricted thereto.

Examples of the nitrogen-containing heterocycle include a pyridine ring, a pyrazine ring, a pyrimidine ring, a pyridazine ring, a triazine ring, a quinoline ring, a quinoxaline ring, and bipyridine structures in which these groups are bound via a single bond. Thereamong, a pyridine ring or a bipyridine structure is preferred.

More specifically, it is preferred that the organic modifying groups contain a structure represented by the following Formula (A) or (B):

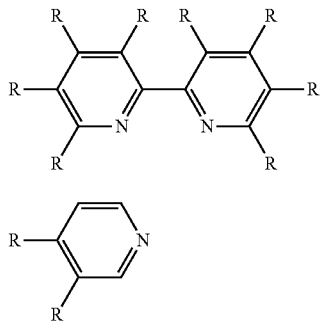

(A)

(B)

(wherein, Rs each independently represent a group selected from the group consisting of hydrogen, hydrocarbon groups having 1 to 6 carbon atoms and hetero groups having 0 to 6 carbon atoms, two of which Rs are optionally bound with each other via a hydrocarbon chain having 1 to 6 carbon atoms to form a ring structure; and at least one of the Rs is a heterohydrocarbon group, allowing the organic modifying groups to have a group capable of binding to the conductive layer via a heteroatom contained in the heterohydrocarbon group).

The term "hetero group" used herein refers to a group containing a heteroatom such as sulfur, nitrogen or oxygen and encompasses heterohydrocarbon groups such as a mercaptoalkyl group as well as carbon-free heteroatom-containing groups such as a thiol group.

Among these organic modifying groups, ones having a bipyridine structure represented by the Formula (A) are preferred, and organic modifying groups containing any one of structures represented by the following Formulae (A-1) to (A-4) are particularly preferred:

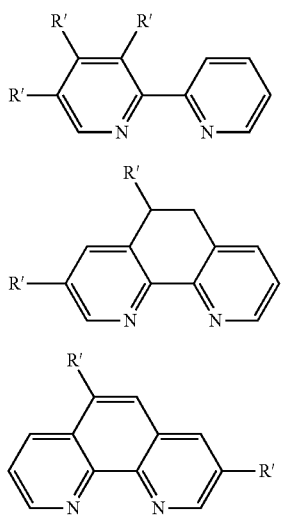

(A-1)

(A-2)

(A-3)

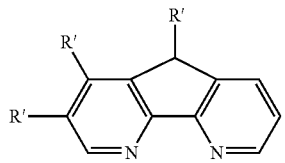

(A-4)

(wherein, R's each represent a group selected from the group consisting of —H, —$CH_3$, —$CH_2$—SH, —$CH_2$—S=SH, —$CH_2$—S— and —$CH_2$—S=S—; and at least one of the R's is —$CH_2$—S— or —$CH_2$—S=S—, allowing the organic modifying groups to bind with the conductive layer via the —$CH_2$—S— or —$CH_2$—S=S—).

Examples of a precursor capable of forming such an organic modifying group, which are represented by the Formula (A), include the followings:
5,5'-bis(mercaptomethyl)-2,2'-bipyridine,
4, 5'-bis(mercaptomethyl)-2,2'-bipyridine,
3,5'-bis(mercaptomethyl)-2,2'-bipyridine,
5-(mercaptomethyl)-5'-(mercaptoethyl)-2,2'-bipyridine,
5-(mercaptomethyl)-4'-(mercaptoethyl)-2,2'-bipyridine,
4-(mercaptomethyl)-5'-(mercaptoethyl)-2,2'-bipyridine,
5, 5'-bis(mercaptoethyl)-2,2'-bipyridine,
5, 5'-bis(mercaptopropyl)-2, 2'-bipyridine,
5-(mercaptomethyl)-5'-(mercaptopropyl)-2,2'-bipyridine,
5-(mercaptopropyl)-5'-(mercaptoethyl)-2,2'-bipyridine,
5, 5'-bis(mercaptomethyl)-2,2'-bipyridine,
3,8'-bis(mercaptomethyl)-1,10'-phenanthroline,
3,8'-bis(mercaptomethyl)-5,6-dihydro-1,10'-phenanthroline,
2,5'-bis(mercaptomethyl)-5-methyl-5H-cyclopenta[2,1-b: 3,4-b']dipyridine,
1,2-bis((3-mercaptomethyl)-2-pyridyl)-1-methyl-ethane,
4,4'-bis(mercaptomethyl)-2,2'-bipyridine,
3,8'-bis(mercaptomethyl)-1, 10'-phenanthroline,
3,8'-bis(mercaptomethyl)-5,6-dihydro-1,10'-phenanthroline,
2,5'-bis(mercaptomethyl)-5-methyl-5H-cyclopenta[2, 1-b: 3,4-b']dipyridine, and
1,2-bis((3-mercaptomethyl)-2-pyridyl)-1-methyl-ethane.

Examples of a precursor capable of forming such an organic modifying group, which are represented by the Formula (B), include the followings:
3-mercaptomethylpyridine,
3-mercaptopyridine,
4-mercaptomethylpyridine, and
4-mercaptopyridine.

The reason why a reduction catalyst having such a structure is capable of achieving a high reaction efficiency has not been completely elucidated yet; however, the reaction efficiency is believed to be improved by the following mechanism.

When a precursor of an organic modifying group having a nitrogen-containing heterocycle (a heterocycle having a nitrogen atom) and a hetero group is allowed to react with the conductive layer, the organic modifying group is densely oriented by self-assembly. It is believed that, in the reduction of $CO_2$ or the like by such a catalyst, a plurality of nitrogen atoms contained in the nitrogen-containing ring contribute to each $CO_2$ molecule, favorably supplying electrons required for the reduction. It is also believed that, since the organic modifying group is densely oriented, generation of hydrogen associated with the reduction on the surface of the conductive layer is inhibited, whereby reaction inhibition caused by bubble generation is suppressed.

When $CO_2$ is reduced using the reduction catalyst according to the present embodiment, $CO_2$ is converted into carbon monoxide (CO), formic acid (HCOOH), formaldehyde (HCHO) and methanol ($CH_3OH$). Further, $CO_2$ may also be converted into acetic acid ($CH_3COOH$), acetaldehyde ($CH_3CHO$) and ethanol ($CH_3CH_2OH$), or oxalic acid (($COOH)_2$), glyoxylic acid ($C_2H_2O_3$), glycolaldehyde ($C_2H_2O_2$) and ethylene glycol ($HOCH_2CH_2OH$). The reduction catalyst according to the present embodiment typically contributes to $CO_2$ reduction reaction; however, it can also be utilized in the reduction reactions of formic acid, formaldehyde and the like. Therefore, the reduction catalyst according to the present embodiment can be used for temporarily reducing $CO_2$ and further reducing the reaction product thereof. It is also possible to reduce CO, formic acid, glyoxal, oxalic acid and so on as the reduction product of $CO_2$ to ethylene glycol by the reduction catalyst.

Figure 2:
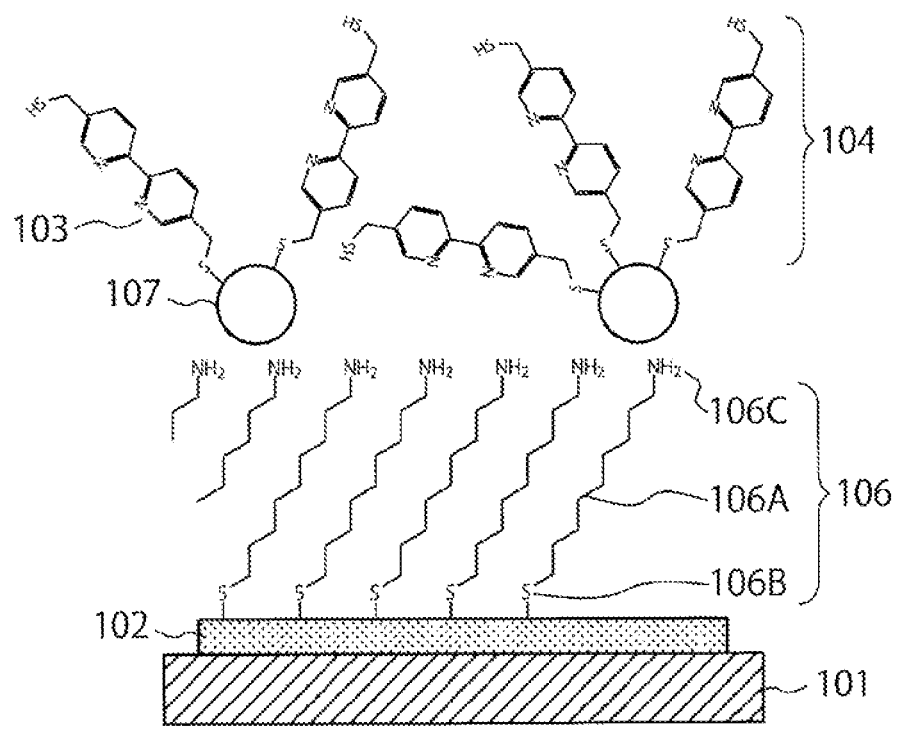
FIG. 2 is a drawing that shows the constitution of the reduction catalyst according to another embodiment.

In the embodiment shown in FIG. 2, metal fine particles 107 (conductor) are fixed on the surface of the charge collector 101 (conductive layer 102) via a spacer layer 106, and the organic layer 104 is formed on the surface of the metal fine particles 107. Further, $CO_2$ reduction reaction is carried out on the metal fine particles 107. Consequently, a highly efficient $CO_2$ reduction reaction can be achieved. This embodiment will now be described in detail.

FIG. 2 is a drawing that shows in detail one example of the constitution of the reduction catalyst according to a second embodiment. As shown in FIG. 2, the reduction catalyst according to this embodiment can be a part of an electrode which electrochemically reduces a low-molecular-weight carbon compound such as $CO_2$, and comprises a laminate constituted by the charge collector 101, the conductive layer 102, the spacer layer 106, the metal fine particles 107 (conductor) and the organic layer 104. The metal fine particles 107 are connected to the charge collector 101 via the spacer layer 106, and the organic layer 104 for promoting reduction reaction is arranged on the surface of the metal fine particles 107.

As the charge collector 101, the same one as that of the first embodiment can be used. On the surface of the charge collector 101, the conductive layer 102 may be formed. The conductive layer 102 can be formed in the same manner as in the first embodiment. The conductive layer in this embodiment is for ensuring an electrical connection between the metal fine particles, which serve as a conductor as described below, and the charge collector.

In the second embodiment, the spacer layer 106 is constituted by organic groups which are capable of chemically binding to the surface of the charge collector 101 or the conductive layer 102 formed thereon. The spacer layer 106 is a monolayer film which is formed by self-assembly of an organic compound chemically adsorbing to the surface of the charge collector 101. The spacer layer 106 has functions of fixing and electrically connecting the metal fine particles 107 to the charge collector 101.

The spacer layer 106 comprises: hydrocarbon groups which optionally contain a heteroatom, such as long-chain alkyl groups 106A; and reactive functional groups 106B and 106C, which are bound to the respective terminals of the hydrocarbon groups.

As the chain length of the hydrocarbon groups 106A (alkylene groups in FIG. 2) increases, a denser and more oriented molecular layer can be obtained with respect to the charge collector 101 or the conductive layer 102.

Accordingly, the fixation of the metal fine particles 107 and the durability of the spacer layer 106 are improved by increasing the chain length of the hydrocarbon groups 106A.

Meanwhile, a marked increase in the alkyl chain length of the hydrocarbon groups 106A leads to an increase in the resistance of tunnel current in the spacer layer 106 and thus an increase in the electrode resistance. Therefore, an alkyl chain of the hydrocarbon groups 106A having preferably 2 to 16 carbon atoms, more preferably 2 to 6 carbon atoms. There is a relation between the thickness and the current as follows:

$$\text{Current}(k_T) = k_0 \exp(-\beta d);$$

wherein $k_0$: constant, $\beta$: constant, d: thickness.
Thus, it is preferred that the thickness is low.

The reactive functional groups 106B (—S— groups in FIG. 2) are formed on one terminal of the respective hydrocarbon groups 106A. The reactive functional groups 106B have an affinity for the charge collector 101 or the conductor layer 102 and are capable of chemically reacting with and binding to the charge collector 101 or the conductor layer 102. This allows the spacer layer 106 to be fixed on the charge collector 101 or the conductor layer 102. When the conductive layer 102 is a metal layer, the reactive functional groups 106B are preferably functional groups capable of forming a covalent bond, such as a thiol group, a disulfide group or a thiocyanate group. Thereamong, a thiol group is more preferred because of its excellent binding strength. Meanwhile, when the conductive layer 102 is constituted by an oxide layer or an oxide film layer on the surface of a stainless steel substrate, the reactive functional groups 106B are preferably functional groups capable of forming a covalent bond, such as a carboxylic acid group, a phosphonic acid group, a phosphate group or an alkoxysilyl group. Thereamong, a phosphonic acid group is more preferred because of its excellent binding strength.

The reactive functional groups 106C (—$NH_2$ groups in FIG. 2) are formed on the other terminal of the respective long-chain alkyl groups 106A. The reactive functional groups 106C have an affinity for the metal fine particles 107 and are capable of chemically reacting with and binding to the metal fine particles 107. Thus, the reactive functional groups 106C fix the metal fine particles 107 on the surface of the spacer layer 106. The reactive functional groups 106C are preferably functional groups capable of forming a covalent bond, such as a thiol group, a disulfide group or a thiocyanate group. Thereamong, a thiol group is more preferred because of its excellent binding strength.

The metal fine particles 107 (conductor) are capable of chemically binding to the surface (reactive functional groups 106C) of the space layer 106. The metal fine particles 107 comprise an organic molecule (reactive functional group) having an electric charge on a part of their surfaces and are thereby charged. The surface electric charge of the metal fine particles 107 generates electrostatic repulsion between the particles, so that aggregation and coarsening of the nano-sized fine particles can be inhibited.

The surface electric charge of the metal fine particles 107 and the electric charge of the reactive functional groups 106C can also be used to fix the metal fine particles 107 on the surface of the spacer layer 106 by electrostatic attraction (electrostatic coupling). More specifically, when the surfaces of the metal fine particles 107 are negatively charged with carboxyl groups, the metal fine particles 107 can be fixed by selecting amino groups or quaternary nitrogen cations as the reactive functional groups 106C. On the other hand, when the surfaces of the metal fine particles 107 are negatively charged with amino groups or quaternary nitrogen cations, the metal fine particles 107 can be fixed by selecting carboxyl groups as the reactive functional groups 106C.

The surface electric charge of the metal fine particles 107 can be provided as an electric charge of an organic molecule resulting from the production of the metal fine particles 107 or an electric charge of an organic molecule resulting from a treatment after the production.

For example, when a reducing agent such as citric acid is used for the reduction and precipitation of the metal fine particles 107 from a liquid layer, the surfaces of the metal fine particles 107 are imparted with citric acid and thus negatively charged. Then, by electrostatically coupling an amino group-molecule to the surfaces of the metal fine particles 107, the surfaces of the metal fine particles 107 are positively charged. Meanwhile, the surfaces of the metal fine particles 107 are positively charged also by allowing them to react with an amine molecule having a covalently binding reactive group such as thiol. That is, an amine molecule having a covalently binding reactive group such as thiol can be used regardless of the presence or absence and the polarity of the surface electric charge of the metal fine particles 107.

The metal fine particles 107 can also function as a catalyst for activating the $CO_2$ reduction reaction and are comprises a metal containing at least one element selected from Au, Ag, Cu, Pt, Zn, Fe, Ti, Sn, In, Bi and Ni. As the metal fine particles 107, a commercially available metal can be selected as appropriate and, particularly, it is preferred to select Au or Ag showing a high catalytic activity.

The metal fine particles 107 have a high catalytic activity when they are nano-fine particles. Therefore, it is preferred that the average particle size of the metal fine particles 107 be, for example, 300 nm or smaller. This is because the activity and efficiency of the metal fine particles 107 are markedly reduced when the average particle size is larger than 300 nm.

The average particle size of the metal fine particles 107 is more preferably 1 nm to 150 nm. This upper limit is set considering the above-described activity. Meanwhile, the lower limit is set considering the difficulty of the fine particle production process. That is, when the metal fine particles 107 have an average particle size of less than 0.5 nm, it is difficult to control the fine particle production process and the cost of the fine particle production is thus increased.

As the metal fine particles 107, fine particles of 50 nm or smaller in average size may be used alone, or aggregates of primary particles comprises these fine particles (secondary particles) may be used as well.

As for a method of determining the average particle size of the metal fine particles 107, the average particle size can be determined based on the particle size distribution measured by a dynamic light scattering method. The dynamic light scattering method is a method where a laser beam is irradiated to a solution in which the metal fine particles 107 are dispersed, any fluctuation of scattered light reflecting the diffusion coefficient is detected and the particle size is then determined utilizing the Stokes-Einstein equation. In a frequency distribution obtained by determining the appearance ratio of each particle size, the largest particle size or the maximum value of distribution is the mode diameter, and this is defined as the average particle size.

The organic layer 104 can be chemically bound to the surfaces of the metal fine particles 107. The organic layer 104 can be formed in the same manner as in the first embodiment.

Examples of the organic molecule constituting the spacer layer 106 include 10-carboxy-1-decanethiol, 7-carboxy-1-heptanethiol, 5-carboxy-1-pentanethiol, 3-carboxy-1-propanethiol, mercaptoacetic acid, 10-carboxydecyl-disulfide, 7-carboxyheptyl-disulfide, 5-carboxypentyl-disulfide, 4,4'-dithiodi butanoic acid, 11-amino-1-undecanethiol, 8-amino-1-octanethiol, 6-amino-1-hexanethiol, 11-mercaptoundecane-1-trimethylammonium chloride, 11-mercaptoundecane-1-sodium sulfonate, 11-mercaptoundecane-1-phosphonic acid, 1,2-ethanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,11-undecanedithiol, 1,12-dodecanedithiol, 1,13-tridecanedithlol, 1,14-tetradecanedithiol, 1,15-pentadecanedithiol and 1,16-hexadecanedithiol.

Further, 1-(2-mercaptoethyl)-3-aminomethylimidazolium bromide, 1-(3-mercaptopropyl)-3-aminomethylimidazolium bromide, 1-(4-mercaptobutyl)-3-aminomethylimidazolium bromide, 1-(5-mercaptopentyl)-3-aminomethylimidazolium bromide, 1-(6-mercaptohexyl)-3-aminomethylimidazolium bromide, 1-(8-mercaptooctyl)-3-aminomethylimidazolium bromide, 1-(9-mercaptononyl)-3-aminomethylimidazolium bromide, 1-(10-mercaptodecyl)-3-aminomethylimidazolium bromide, 1-(11-mercaptoundecyl)-3-aminomethylimidazolium bromide, 1-(12-mercaptododecyl)-3-aminomethylimidazolium bromide, 1-(2-mercaptoethyl)-3-(2-aminoethyl)-imidazolium bromide, 1-(2-mercaptoethyl)-3-(3-aminopropyl)-imidazolium bromide, 1-(2-mercaptoethyl)-3-(4-aminobutyl)-imidazolium bromide, 1-(2-mercaptoethyl)-3-(5-amnopentyl)-Imidazolium bromide, 1-(2-mercaptoethyl)-3-(6-amnohexyl)-imidazolium bromide, 1-(2-mercaptoethyl)-3-(8-aminooctyl)-imidazoium bromide, 1-(2-mercaptoethyl)-3-(9-aminononyl)-imidazolium bromide, 1-(2-mercaptoethyl)-3-(10-aminodecyl)-imidazolium bromide, 1-(2-mercaptoethyl)-3-(11-aminoundecyl)-imidazolium bromide, 1-(2-mercaptoethyl)-3-(12-aminododecyl)-imidazoium bromide, 1-(4-mercaptobutyl)-3-(2-N-methylaminoethyl)-imidazolium bromide, 1-(6-mercaptohexyl)-3-(3-N,N-dimethylaminopropyl)-imidazolium bromide, 1-(8-mercaptohexyl)-3-(4-N,N-ethylmethylaminobutyl)-imidazolium bromide, 1-(2-mercaptoethyl)-4-aminomethylpyridinium bromide, 1-(3-mercaptopropyl)-4-aminomethylpyridinium bromide 1-(4-mercaptobutyl)-4-aminomethylpyridinium bromide, 1-(5-mercaptopentyl)-4-aminomethylpyridinium bromide, 1-(6-mercaptohexyl)-4-aminomethylpyridinium bromide, 1-(8-mercaptooctyl)-4-aminomethylpyridinium bromide, 1-(9-mercaptononyl)-4-aminomethylpyridinium bromide, 1-(10-mercaptodecyl)-4-aminomethylpyridinium bromide, 1-(11-mercaptoundecyl)-4-aminomethylpyridinium bromide, 1-(12-mercaptododecyl)-4-aminomethylpyrdinium bromide, 1-(2-mercaptoethyl)-4-(2-aminoethyl)-pyridinium bromide, 1-(2-mercaptoethyl)-4-(3-aminopropyl)-pyridinium bromide, 1-(2-mercaptoethyl)-4-(4-aminobutyl)-pyridinium bromide, 1-(2-mercaptoethyl)-4-(5-aminopentyl)-pyridinium bromide, 1-(2-mercaptoethyl)-4-(6-aminohexyl)-pyridinium bromide, 1-(2-mercaptoethyl)-4-(8-aminooctyl)-pyridinium bromide, 1-(2-mercaptoethyl)-4-(9-aminononyl)-pyridinium bromide, 1-(2-mercaptoethyl)-4-(10-aminodecyl)-pyridinium bromide, 1-(2-mercaptoethyl)-4-(11-aminoundecyl)-pyridinium bromide, 1-(2-mercaptoethyl)-4-(12-aminododecyl)-pyridinium bromide, 1-(5-mercaptopentyl)-4-(3-N-methylaminopropyl)-pyridinium bromide, 1-(9-mercaptononyl)-4-(4-N,N-dimethylaminobutyl)-pyridinium bromide, 1-(11-mercaptoundecyl)-4-(6-N,N-ethylmethylaminohexyl)

pyridinium bromide, 1-(2-mercaptoethyl)-1-aminomethylpyrrolidinium bromide, 1-(3-mercaptopropyl)-1-aminomethylpyrrolidinium bromide, 1-(4-mercaptobutyl)-1-aminomethylpyrrolidinium bromide, 1-(5-mercaptopentyl)-1-aminomethylpyrrolidinium bromide, 1-(6-mercaptohexyl)-1-aminomethylpyrrolidinium bromide, 1-(8-mercaptooctyl)-1-aminomethylpyrrolidinium bromide, 1-(9-mercaptononyl)-1-aminomethylpyrrolidinium bromide, 1-(10-mercaptodecyl)-1-aminomethylpyrrolidinium bromide, 1-(11-mercaptoundecyl)-1-aminomethylpyrrolidinium bromide, 1-(12-mercaptododecyl)-1-aminomethylpyrrolidinium bromide, 1-(2-mercaptoethyl)-1-(2-aminoethyl)-pyrrolidinium bromide, 1-(2-mercaptoethyl)-1-(3-aminopropyl)-pyrrolidinium bromide, 1-(2-mercaptoethyl)-1-(4-aminobutyl)-pyrrolidinium bromide, 1-(2-mercaptoethyl)-1-(6-aminohexyl)-pyrrolidinium bromide, 1-(2-mercaptoethyl)-1-(8-aminooctyl)-pyrrolidinium bromide, 1-(2-mercaptoethyl)-1-(9-aminononyl)-pyrrolidinium bromide, 1-(2-mercaptoethyl)-1-(10-aminodecyl)-pyrrolidinium bromide, 1-(2-mercaptoethyl)-1-(11-aminoundecyl)-pyrrolidinium bromide, 1-(2-mercaptoethyl)-1-(12-aminododecyl)-pyrrolidinium bromide, 1-(2-mercaptoethyl)-1-aminomethylpiperidinium bromide, 1-(3-mercaptopropyl)-1-aminomethylpiperidinium bromide, 1-(4-mercaptobutyl)-1-aminomethylpiperidinium bromide, 1-(5-mercaptopentyl)-1-aminomethylpiperidinium bromide, 1-(6-mercaptohexyl)-1-aminomethylpiperidinium bromide, 1-(8-mercaptooctyl)-1-aminomethylpiperidinium bromide, 1-(9-mercaptononyl)-1-aminomethylpiperidinium bromide, 1-(10-mercaptodecyl)-1-aminomethylpiperidinium bromide, 1-(11-mercaptoundecyl)-1-aminomethylpiperidinium bromide, 1-(12-mercaptododecyl)-1-aminomethylpiperidinium bromide, 1-(2-mercaptoethyl)-1-(2-aminoethyl)-piperidinium bromide, 1-(2-mercaptoethyl)-1-(3-aminopropyl)-piperidinium bromide, 1-(2-mercaptoethyl)-1-(4-aminobutyl)-piperidinium bromide, 1-(2-mercaptoethyl)-1-(6-aminohexyl)-piperidinium bromide, 1-(2-mercaptoethyl)-1-(8-aminooctyl)-piperidinium bromide, 1-(2-mercaptoethyl)-1-(9-aminononyl)-piperidinium bromide, 1-(2-mercaptoethyl)-1-(10-aminodecyl)-piperidinium bromide, 1-(2-mercaptoethyl)-1-(11-aminoundecyl)-piperidinium bromide, 1-(2-mercaptoethyl)-1-(12-aminododecyl)-piperidinium bromide, 1-mercaptoethyl-2-(N-aminomethyl-N,N-dimethylammonium) bromide, 1-mercaptopropyl-3-(N-aminomethyl-N,N-dimethylammonium)bromide, 1-mercaptobutyl-4-(N-aminomethyl-N,N-dimethylammonium)bromide, 1-mercaptopentyl-5-(N-aminomethyl-N,N-dimethylammonium)bromide, 1-mercaptohexyl-6-(N-aminomethyl-N,N-dimethylammonium)bromide, 1-mercaptooctyl-8-(N-aminomethyl-N,N-dimethylammonium)bromide, 1-mercaptononyl-9-(N-aminomethyl-N,N-dimethylammonium)bromide, 1-mercaptodecyl-10-(N-aminomethyl-N,N-dimethylammonium)bromide, 1-mercaptoundecyl-11-(N-aminomethyl-N,N-dimethylammonium)bromide, 1-mercaptododecyl-12-(N-aminomethyl-N,N-dimethylammonium)bromide, 1-mercaptoethyl-2-(N-(2-aminoethyl)-N,N-dimethylammonium)bromide, 1-mercaptoethyl-2-(N-(3-aminopropyl)-N,N-dimethylammonium)bromide, 1-mercaptoethyl-2-(N-(4-aminobutyl)-N,N-dimethylammonium)bromide, 1-mercaptoethyl-2-(N-(5-aminopentyl)-N,N-dimethylammonium)bromide, 1-mercaptoethyl-2-(N-(6-aminohexyl)-N,N-dimethylammonium)bromide, 1-mercaptoethyl-2-(N-(8-aminooctyl)-N,N-dimethylammonium)bromide, 1-mercaptoethyl-2-(N-(8-aminooctyl)-N,N-dimethylammonium)bromide, 1-mercaptoethyl-2-(N-(9-aminononyl)-N,N-dimethylammonium)bromide, 1-mercaptoethyl-2-(N-(10-aminodecane)-N,N-dimethylammonium)bromide, 1-mercaptoethyl-2-(N-(11-aminoundecane)-N,N-dimethylammonium) bromide, 1-mercaptoethyl-2-(N-(12-aminododecane)-N,N-dimethylammonium)bromide, 1-mercaptoethyl-2-(N-aminomethyl-N,N-methylethylammonium)bromide, 5,5'-bis(mercaptomethyl)-2,2'-bipyridine, 3-mercaptopyridine, 4-mercaptopyridine and the like can also be used.

These amino compounds may form a salt with hydrofluoric acid, hydrochloric acid, bromic acid, folic acid, sulfuric acid, nitric acid, phosphoric acid or the like. Further, the counter anions of the quaternary nitrogen cations of the ammonium salts, imidazolium salts, pyridinium salts, pyrrolidinium salts, piperidinium salts and the like may each be, for example, a fluoride ion, a chloride ion, a bromide ion, an iodide ion, $HCO_3^-$, $BF_4^-$, $PF_6^-$, $CF_3COO^-$, $CF_3SO_3^-$, $NO_3^-$, $SCN^-$, $N(CN)_2^-$, $C(CN)_3^-(CF_3SO_2)_3C^-$, a bis(trifluoromethoxysulfonyl)imide anion or a bis(perfluoroethyisulfonyl)imide anion.

In the second embodiment, the spacer layer 106 may have the same constitution as the modified organic layer 104. That is, the modified organic layer 104 in the first embodiment can be directly used as the spacer layer 106. Therefore, the spacer layer 106 can be formed using the above-described precursor compound.

Such a reduction catalyst according to the second embodiment can be produced by, for example, the following methods.

First, as a method of forming the spacer layer 106 on the surface of the conductive layer 102, a known method can be employed. Examples thereof include a method of bringing the charge collector 101 into contact with a solution in which organic molecules having an affinity for the charge collector 101 are dissolved, a method of forming a film by evaporating organic molecules in a high vacuum, and a method of spraying organic molecules using a spray or the like.

In the method of bringing the charge collector 101 into contact with a solution in which organic molecules are dissolved, the organic molecules that are chemically adsorbed to the charge collector 101 spontaneously form aggregates by the van der Waals force and hydrophobic interaction between the adsorbed molecules. The adsorbed molecules densely aggregate with each other, whereby an oriented monomolecular layer (Self-Assembled Monolayer: SAM) is formed.

A solvent for dissolving the organic molecules is not restricted as long as it can dissolve the organic molecules. Examples of the solvent for dissolving the organic molecules include alcohols such as ethanol, and aromatic or aliphatic organic solvents such as toluene and hexane. It is preferred to use ethanol from the standpoints of, for example, the solubility of the organic molecules therein and the ease of handling.

An exemplary method of forming the spacer layer 106 on the surface of the charge collector 101 (conductive layer 102) will now be described in detail.

An ethanol solution in which organic molecules are dissolved is prepared, and the charge collector 101 having the conductive layer 102 formed thereon is then immersed in the ethanol solution for several minutes to several hours. As a result, the spacer layer 106 is formed on the surface of the charge collector 101. Since the conditions such as the concentration of the organic molecules, the immersion time and the immersion temperature affect the formation state of the resulting monomolecular layer, the conditions may be changed as appropriate in accordance with the structure and the like of the organic molecules.

For example, with regard to the concentration, when the concentration of the organic molecules is low, it takes time to form a monomolecular layer. Meanwhile, when the concentration of the organic molecules is excessively high, excess molecules may be stacked and adsorbed on the resulting monomolecular layer. Thus, the concentration of the organic molecules is preferably 0.1 mM to 100 mM, more preferably 1 mM to 10 mM. Further, with regard to the immersion time, although the adsorption of the organic molecules is completed in several minutes, a longer time is required for the formation of a dense and oriented monomolecular layer. Thus, the immersion time is preferably 1 minute to 100 hours, more preferably 12 hours to 72 hours. The immersion temperature affects the formation of a dense and oriented monomolecular layer. Thus, taking into consideration the vapor pressure, boiling point and the like of the solvent, the immersion temperature is desirably not higher than 60° C. In order to form the dense and oriented monomolecular layer, lower temperature and longer immersion time is preferred. For example, the immersion temperature may be not more than −10° C. In some case, the immersion temperature is preferably about −30° C. Generally, lower temperature is preferred to shorten a process time from the point of view of manufacturability. However, the immersion temperature is preferably not less that −10° C. from the point of view of reactivity, manufacturing energy, manufacturing cost, and so on. The immersion temperature is preferably not less room temperature from the point of view of manufacturing energy and manufacturing cost.

As a method of confirming the formation of the spacer layer 106, a known method can be employed.

For example, as an electrochemical method, evaluation can be performed by a cyclic voltammetry method. More specifically, in a 0.2 M aqueous potassium chloride (KCl) solution in which 1 mM of potassium hexacyanoferrate (III) ($K_3[Fe(CN)_6]$) or 1 mM of hexaammineruthenium (III) chloride ($[Ru(NH_3)_6]Cl_3$) is dissolved, the electrochemical response of the charge collector 101 is measured and compared before and after the step of adsorbing the spacer layer 106. As a result, a decrease caused by the formation of the spacer layer 106 in the reaction current generated by electrochemical redox reaction between hexacyanoferrate (III) anions and hexaammineruthenium (III) cations can be observed. The decrease occurs because the formation of the spacer layer 106 on the charge collector 101 inhibits the redox reaction between hexacyanoferrate (III) anions and hexaammineruthenium (III) cations. This enables to indirectly confirm the formation of the spacer layer 106.

Alternatively, as a surface analysis method, evaluation can also be performed by a reflection method using a Fourier transform infrared spectrophotometer (FT-IR). By this, the infrared spectrum of a thin film and that of the species of adsorbed molecules on the surface of the charge collector 101 can be measured with high sensitivity. That is, the structure of the organic molecules, particularly information on the functional group, can be learned. Further, when the spacer layer 106 and the organic layer 104 have anions, the composition of the anions can be measured using an X-ray photoelectron spectroscope (XPS). Moreover, by using a contact angle meter, the presence or absence of the spacer layer 106 can be measured based on the difference in wettability with water.

As a method of fixing the metal fine particles 107 on the surface of the spacer layer 106, a known method can be employed. For example, by immersing the charge collector 101 having the spacer layer 106 formed thereon into a solution in which the metal fine particles 107 are dispersed, the reactive functional groups 106C of the spacer layer 106 and the surface of the metal fine particles 107 are allowed to react with each other and thereby fixed.

The solution for dispersing the metal fine particles 107 is not restricted as long as the metal fine particles 107 are dispersed therein stably. Examples of the solution for dispersing the metal fine particles 107 include water, ethanol and toluene. It is preferred to use water or ethanol from the standpoint of the ease of handling.

An exemplary method of fixing the metal fine particles 107 on the surface of the spacer layer 106 will now be described in detail. An aqueous solution in which the metal fine particles 107 are dispersed is prepared, and the charge collector 101 having the spacer layer 106 formed thereon is then immersed in the aqueous solution for several hours. As a result, the metal fine particles 107 can be fixed on the surface of the spacer layer 106. Since the conditions such as the concentration of the solution in which the metal fine particles 107 are dispersed, the immersion time and the immersion temperature are dependent on the synthesis method and stability of the metal fine particles 107, the conditions may be changed as appropriate for each dispersion solution.

For example, with regard to the concentration, when the concentration of the metal fine particles 107 is low, it takes time to fix the metal fine particles 107. Meanwhile, when the concentration of the metal fine particles 107 is excessively high, the metal fine particles 107 may aggregate and thus not be fixed on the spacer layer 106. Further, with regard to the immersion time, the longer the immersion time, the more sufficiently the metal fine particles 107 can be fixed. Thus, the immersion time is preferably 1 hour to 50 hours, more preferably 5 hours to 24 hours. A high immersion temperature may reduce the dispersion stability of the metal fine particles 107 and induce aggregation of the metal fine particles 107. Aggregation of the metal fine particles 107 makes it difficult to uniformly fix the metal fine particles 107 on the surface of the spacer layer 106. Thus, the immersion temperature is preferably not higher than 35° C. In order to fix the metal fine particles sufficiently, lower temperature is preferred. For example, the immersion temperature may be −30° C. However, the immersion temperature is preferably not less that −10° C. from the point of view of reactivity, manufacturing energy, manufacturing cost, and so on. The immersion temperature is preferably not less room temperature from the point of view of manufacturing energy and manufacturing cost.

As a method of confirming the fixation of the metal fine particles 107 on the surface of the spacer layer 106, a known method can be employed.

For example, as an electrochemical method, evaluation can be performed by a cyclic voltammetry method. More specifically, in a 0.2 M aqueous potassium chloride (KCl) solution in which 1 mM of potassium hexacyanoferrate (III) ($K_3[Fe(CN)_6]$) or 1 mM of hexaammineruthenium (III) chloride ($[Ru(NH_3)_6]Cl_3$) is dissolved, the electrochemical response of the charge collector 101 is measured and compared before and after the step of fixing the metal fine particles 107. As a result, an increase caused by the fixation of the metal fine particles 107 in the reaction current generated by electrochemical redox reaction between hexacyanoferrate (III) anions and hexaammineruthenium (III) cations can be observed. The increase occurs because the fixation of the metal fine particles 107 on the spacer layer 106 induces hexacyanoferrate (III) anions and hexaammineruthenium (III) cations to undergo a redox reaction. This enables to indirectly confirm the fixation of the metal fine particles 107.

Alternatively, as a surface analysis method, a direct observation can be made under a scanning electron microscope (SEM), a transmission electron microscope (TEM), an atomic force electron microscope (AFM) or a scanning transmission electron microscope (STEM). Further, the metal composition can be evaluated by an energy dispersive X-ray analysis (EDX), an electron probe microanalysis (EPMA), X-ray photoemission spectroscopy (XPS) or the like.

As a method of forming the organic layer 104 on the surfaces of the metal fine particles 107, a known method can be employed. For example, by bringing the metal fine particles 107 into contact with a solution in which a precursor compound having an affinity for the metal fine particles 107 is dissolved, the surfaces of the metal fine particles 107 and the precursor compound are allowed to react with each other.

A solvent for dissolving the precursor compound is not restricted as long as it can dissolve the precursor compound. Examples of the solvent for dissolving the precursor compound include alcohols such as ethanol, and aromatic or aliphatic organic solvents such as toluene and hexane. It is preferred to use ethanol from the standpoints of, for example, the solubility of the precursor compound therein and the ease of handling.

An exemplary method of allowing the precursor compound to react with the surfaces of the metal fine particles 107 will now be described in detail. In an ethanol solution in which the precursor compound is dissolved, the metal fine particles 107 are immersed for several minutes to several hours. As a result, an organic layer can be formed on the surfaces of the metal fine particles 107. Since the conditions such as the concentration of the precursor compound, the immersion time and the immersion temperature affect the formation state of the resulting organic layer 104, the conditions may be changed as appropriate in accordance with the structure and the like of the precursor compound.

For example, with regard to the concentration, when the concentration of the precursor compound is low, it takes time to form an organic layer. Meanwhile, when the concentration of the precursor compound is excessively high, excess molecules may be stacked and adsorbed on the resulting organic layer. Thus, the concentration of the precursor compound is preferably 0.1 mM to 100 mM, more preferably 1 mM to 10 mM. Further, with regard to the immersion time, although the adsorption of the precursor compound is completed in several minutes, a longer time is required for the formation of a dense and oriented organic layer. Thus, the immersion time is preferably 1 minute to 100 hours, more preferably 12 hours to 72 hours. The immersion temperature affects the formation of the dense and oriented organic layer 104. Thus, taking into consideration the vapor pressure, boiling point and the like of the solvent, the immersion temperature is preferably not higher than 60° C. In order to form the dense and oriented organic layer, lower temperature is preferred. For example, the immersion temperature may be −30° C. However, the immersion temperature is preferably not less that −10° C. from the point of view of reactivity, manufacturing energy, manufacturing cost, and so on. The immersion temperature is preferably not less room temperature from the point of view of manufacturing energy and manufacturing cost.

The metal fine particles 107 can also be further stacked on the organic layer 104. In the case of further stacking the metal fine particles 107, the amount of the metal fine particles 107 can be increased by repeating the step of fixing the metal fine particles 107 and the step of forming the organic layer 104. In this case, as the precursor compound, a compound having two or more reactive groups capable of binding to the metal fine particles is used.

An exemplary method of further stacking the metal fine particles 107 and the organic layer 104 will now be described in detail.

The precursor compound has two or more reactive groups. Thus, after the formation of an organic layer, a large number of the reactive groups exist on the surface of the organic layer; therefore, by bringing the metal fine particles into contact with the organic layer, the metal fine particles are supported on the surface of the organic layer. Further, when a material containing a cation such as quaternary ammonium is used as the precursor compound, metal nanoparticles of the metal fine particles 107 can be supported on the surface of the organic layer by performing electrochemical reduction or reduction with hydrogen gas where an anionic aqueous solution which contains the element constituting the metal fine particles 107 is brought into contact.

In cases where metal fine particles are formed by such a method, Au or Pt can be selected as the metal fine particles 107. Examples of a raw material of an anion containing Au or Pt include salts such as sodium tetrachloroaurate (III) dihydrate ($Na[AuCl_4]2H_2O$), potassium chloroaurate (III) ($K[AuCl_4]$), potassium tetrachloroplatinate (II) ($K_2[PtCl_4]$) and potassium hexachloroplatinate (IV) ($K_2[PtCl_6]$).

More specifically, a substrate which comprises the metal fine particles 107 having the organic layer is immersed into a solution in which an anion containing Au or Pt is dissolved, whereby anion exchange can be performed. This anion exchange can be performed for a period of 30 minutes to 2 hours in an aqueous solution whose concentration of a salt formed by the anion containing Au or Pt is 0.1 mM to 100 mM. As a result, the anion containing Au or Pt can be electrostatically bound to the organic layer 104.

Subsequently, this substrate is immersed in an alkaline aqueous solution and thereby electrochemically reduced, or the substrate is immersed in an aqueous solution dissolving $H_2$ gas and thereby reduced. For electrochemical reduction of the substrate, constant-potential electrolytic reduction is performed in an aqueous sodium bicarbonate solution having a concentration of 0.5 M. As for the electrolysis conditions, in a three-electrode cell in which the substrate is used as a working electrode, a reference electrode is made of silver-silver chloride and a counter electrode is made of Pt, an electric potential of −0.5 V is applied to the working electrode for about 1 hour. Meanwhile, when the substrate is immersed in an aqueous solution dissolving $H_2$ gas and thereby reduced, the immersion may be performed for about 1 hour. As a result, the metal fine particles 107 can be formed on the surface of the organic layer.

Thereafter, the surfaces of the Au or Pt nanoparticles (metal fine particles 107) precipitated on the surface of the organic layer by the above-described method can be further modified with the organic modifying groups 103.

In this manner, when the metal fine particles 107 are further stacked, the amount of the supported metal fine particles 107 can be increased by repeating the step of precipitating the metal fine particles 107 on the surface of an organic layer and the step of forming the organic layer 104.

In the present embodiment, the metal fine particles 107 are fixed on the surface of the charge collector 101 (conductive layer 102) via the spacer layer 106, and the organic layer 104 is formed on the surface of the metal fine particles 107. Further, $CO_2$ reduction reaction is carried out on the metal fine particles 107. Consequently, the following effects can be attained.

By the formation of the metal fine particles 107, the reaction area (surface area) can be made larger than that of a reduction catalyst comprises a plate-form metal layer. In addition, according to the first embodiment, the number of organic modifying groups per unit area can be increased. As a result, the efficiency of $CO_2$ reduction reaction can be improved.

2. Photochemical Reaction Cell

A photochemical reaction cell comprising the reduction catalyst according to the present embodiment will now be described referring to FIGS. 3 to 5.

Figure 3:
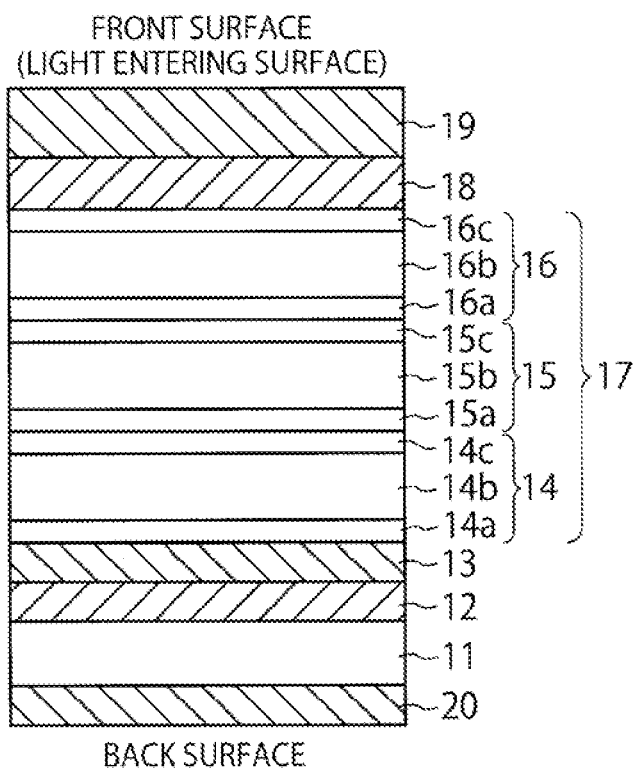
FIG. 3 is a cross-sectional view showing the structure of the photochemical reaction cell according to the present embodiment.

FIG. 3 is a cross-sectional view showing the structure of the photochemical reaction cell according to the present embodiment. As shown in FIG. 3, the photochemical reaction cell according to the present embodiment comprises a laminate constituted by a substrate 11, a reflective layer 12, a reduction electrode layer 13, a multi-junction solar cell 17, an oxidation electrode layer 18, an oxidation catalyst layer 19 and a reduction catalyst layer 20.

Although the details will be described later, the above-described $CO_2$ reduction catalyst is applied as the reduction catalyst layer 20 in the photochemical reaction cell.

On the surface of the substrate 11, the reflective layer 12, the reduction electrode layer 13, the multi-Junction solar cell 17, the oxidation electrode layer 18 and the oxidation catalyst layer 19 are formed. Meanwhile, on the back of the substrate 11, the reduction catalyst layer 20 is formed.

The substrate 11 is provided for the purpose of supporting the photochemical reaction cell and thereby increasing the mechanical strength. The substrate 11 has electroconductivity and is constituted by, for example, a metal plate of Au, Ag, Cu, Pt, Zn, Fe, Ti, Sn, In, Bi or NI, or an alloy plate containing at least one of these metals such as an SUS plate. Alternatively, the substrate 11 may be constituted by an electroconductive resin or the like. Further, the substrate 11 may be constituted by a semiconductor substrate made of Si, Ge or the like. As described below, the substrate 11 may also be constituted by an ion exchange membrane.

The reflective layer 12 is formed on the surface of the substrate 11. The reflective layer 12 is constituted by a material capable of reflecting light, for example, a metal layer or a distributed Bragg reflector layer comprises a semiconductor multilayer film. This reflective layer 12 is formed between the substrate 11 and the multi-Junction solar cell 17, whereby light that could not be absorbed by the multi-junction solar cell 17 is reflected and allowed to enter the multi-Junction solar cell 17 again. As a result, the light absorptivity in the multi-junction solar cell 17 can be improved.

The reduction electrode layer 13 is formed on the reflective layer 12. The reduction electrode layer 13 is formed on a surface of an n-type semiconductor layer (the below-described n-type amorphous silicon layer 14a) of the multi-Junction solar cell 17. Thus, it is preferred that the reduction electrode layer 13 be constituted by a material capable of forming an Ohmic contact with the n-type semiconductor layer. The reduction electrode layer 13 is constituted by, for example, a metal such as Ag, Au, Al or Cu, or an alloy containing at least one of these metals. Alternatively, the reduction electrode layer 13 is constituted by a transparent conductive oxide such as ITO (indium tin oxide), zinc oxide (ZnO), FTO (fluorine-doped tin oxide), AZO (aluminum-doped zinc oxide) or ATO (antimony-doped tin oxide). Further, the reduction electrode layer 13 may also be constituted by, for example, a structure in which a metal and a transparent conductive oxide are laminated, a structure in which a metal and other conductive material are compounded, or a structure in which a transparent conductive oxide and other conductive material are compounded.

The multi-Junction solar cell 17 is formed on the reduction electrode layer 13 and constituted by a first solar cell 14, a second solar cell 15 and a third solar cell 16. The first solar cell 14, the second solar cell 15 and the third solar cell 16 are solar cells each comprising a pin-junction semiconductor and have different light absorption wavelengths. By laminating these solar cells in a planar form, the multi-Junction solar cell 17 is enabled to absorb sunlight over a wide wavelength range, so that the solar energy can be utilized more efficiently. Further, since these solar cells are connected in series, a high open-circuit voltage can be obtained.

More specifically, the first solar cell 14 is constituted by an n-type amorphous silicon (a-Si) layer 14a, an intrinsic amorphous silicon germanium (a-SIGe) layer 14b and a p-type microcrystalline silicon (μc-Si) layer 14c, which are formed sequentially in the order mentioned from the lower side. The a-SiGe layer 14b is a layer which absorbs light in a short wavelength region of about 400 nm. That is, in the first solar cell 14, light energy in the short wavelength region causes charge separation.

The second solar cell 15 is constituted by an n-type a-SI layer 15a, an intrinsic a-SIGe layer 15b and a p-type μc-Si layer 15c, which are formed sequentially in the order mentioned from the lower side. The a-SiGe layer 15b is a layer which absorbs light in a medium wavelength region of about 600 nm. That is, in the second solar cell 15, light energy in the medium wavelength region causes charge separation.

Further, the third solar cell 16 is constituted by an n-type a-Si layer 16a, an intrinsic a-Si layer 16b and a p-type μc-Si layer 16c, which are formed sequentially in the order mentioned from the lower side. The a-Si layer 16b is a layer which absorbs light in a long wavelength region of about 700 nm. That is, in the third solar cell 16, light energy in the long wavelength region causes charge separation.

As described above, in the multi-junction solar cell 17, charge separation is induced by light in each wavelength region. In other words, holes are separated to the anode side (surface side) while electrons are separated to the cathode side (back side). By this constitution, the multi-junction solar cell 17 generates an electromotive force.

Although the multi-junction solar cell 17 constituted by a laminated structure of three solar cells was described above as an example, the constitution of the multi-junction solar cell 17 is not restricted thereto. The multi-junction solar cell 17 may be constituted by a laminated structure of two or four or more solar cells. Alternatively, a single solar cell may be used in place of the multi-junction solar cell 17. Further, although the solar cells comprising a pin-junction semiconductor were described, solar cells comprising a pn-Junction semiconductor may be used instead. Moreover, although an example where the semiconductor layer is constituted by Si and Ge was described above, the material of the semiconductor layer is not restricted thereto, and the semiconductor layer may be constituted by a compound semiconductor system such as a GaAs, GaInP, AlGaInP, CdTe or CuInGaSe system. Furthermore, various forms such as single-crystal, polycrystalline and amorphous forms can be applied to the semiconductor layer.

The oxidation catalyst layer 19 is formed on the oxidation electrode layer 18. The oxidation catalyst layer 19 is formed on the anode side of the multi-junction solar cell 17. In an oxidation catalyst layer, when the hydrogen ion concentration of an electrolyte solution is less than 7 (pH<7), $H_2O$ is oxidized to produce $O_2$ and $H^+$. Meanwhile, when the hydrogen ion concentration of the electrolyte solution is higher than 7 (pH >7), $OH^-$ is oxidized to produce $O_2$ and $H_2O$.

Thus, the oxidation catalyst layer 19 is constituted by a material which lowers the activation energy for oxidation reaction. In other words, the oxidation catalyst layer 19 is constituted by a material which reduces an overvoltage in a reaction where $H_2O$ or $OH^-$ Is oxidized to extract electrons. Examples of such a material include binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O) and ruthenium oxide (Ru—O); ternary metal oxides such as Ni—Co—O, La—Co—O, Ni—La—O and Sr—Fe—O; quaternary metal oxides such as Pb—Ru—Ir—O and La—Sr—Co—O; and metal complexes such as an Ru complex and an Fe complex. The form of the oxidation catalyst layer 19 is not restricted to a thin film form, and the oxidation catalyst layer 19 may take a lattice form, a particle form or a wire form.

In this example, an irradiated light passes through the oxidation catalyst layer 19 as well as the oxidation electrode layer 18 to reach the multi-junction solar cell 17. Thus, the oxidation catalyst layer 19 arranged on the side irradiated with light has optical transparency for irradiated light. More specifically, the transmittance of the oxidation catalyst layer 19 on the irradiated side is at least 10% or higher, desirably 30% or higher, of the amount of the irradiated light.

The reduction catalyst layer 20 is formed on the back of the substrate 11. The reduction catalyst layer 20 is formed on the cathode side of the multi-junction solar cell 17 and reduces $CO_2$ to produce a carbon compound (such as carbon monoxide, formic acid, formaldehyde, methane, methanol, acetic acid, acetaldehyde, ethanol or ethylene glycol). Thus, the reduction catalyst layer 20 is constituted by a material which lowers the activation energy for $CO_2$ reduction.

As the reduction catalyst layer 20, the above-described reduction catalyst is applied. That is, the reduction catalyst layer 20 comprises a laminate constituted by a conductive layer and an organic layer comprises organic modifying groups.

Further, a protective layer may be arranged on the surface of the multi-Junction solar cell 17 or between an electrode layer and a catalyst layer on the side irradiated with light (in this example, between the oxidation electrode layer 18 and the oxidation catalyst layer 19). The protective layer has electroconductivity and inhibits corrosion of the multi-junction solar cell 17 in redox reaction. As a result, the service life of the multi-Junction solar cell 17 can be extended. The protective layer also has optical transparency as required. The protective layer may be, for example, a dielectric thin film of $TiO_2$, $ZrO_2$, $Al_2O_3$, $SiO_2$, $HfO_2$ or the like. The thickness of the protective layer is preferably 10 nm or less, more preferably 5 nm or less, so as to attain electroconductivity by a tunneling effect.

Figure 4:
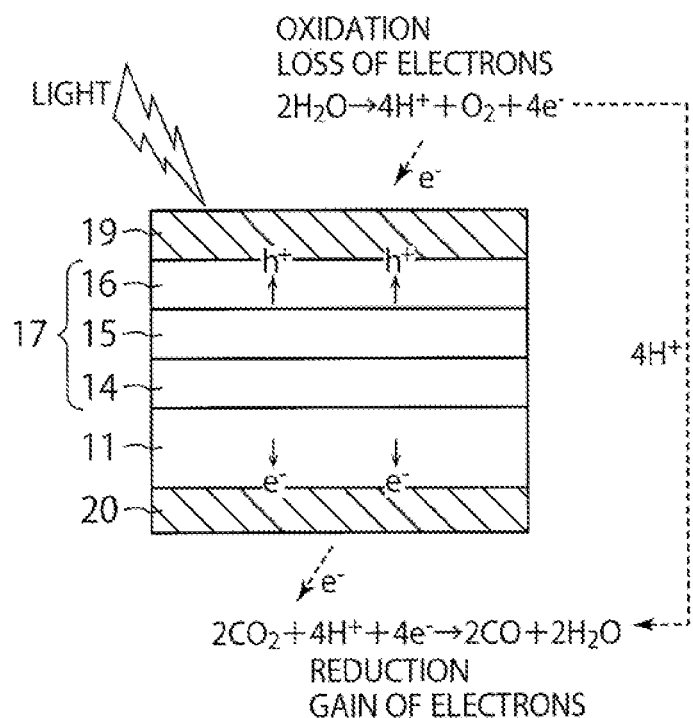
FIG. 4 is a cross-sectional view showing one example of the operating principle of the photochemical reaction cell according to the present embodiment.

FIG. 4 is a cross-sectional view showing one example of the operating principle of the photochemical reaction cell according to the present embodiment. FIG. 5 is a cross-sectional view showing another example of the operating principle of the photochemical reaction cell according to the present embodiment. In these figures, the reflective layer 12, the reduction electrode layer 13 and the oxidation electrode layer 18 are omitted.

Figure 5:
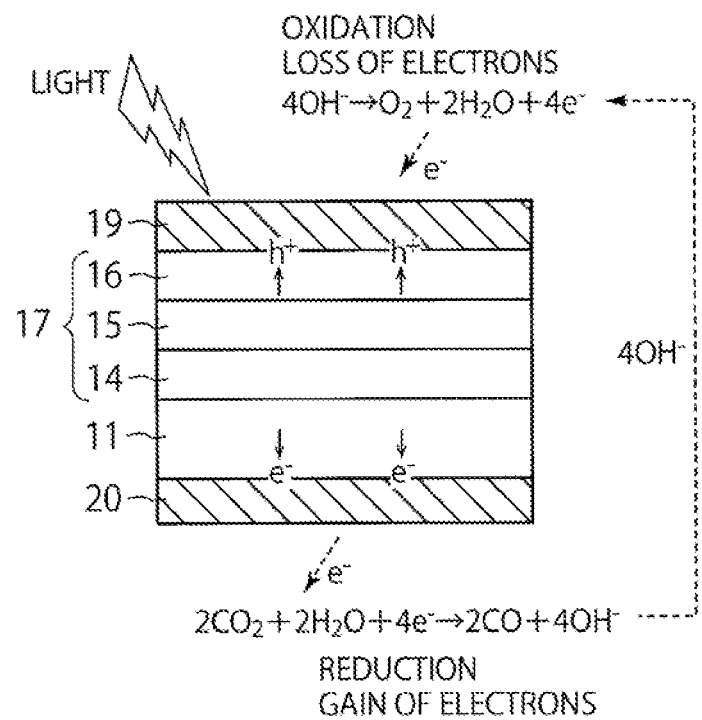
FIG. 5 is a cross-sectional view showing another example of the operating principle of the photochemical reaction cell according to the present embodiment.

As shown in FIGS. 4 and 5, a light entering from the surface side passes through the oxidation catalyst layer 19 and the oxidation electrode layer 18 to reach the multi-Junction solar cell 17. Once the multi-Junction solar cell 17 absorbs the light, it generates and separates photoexcited electrons and their pairing holes. That is, in the respective solar cells (the first solar cell 14, the second solar cell 15 and the third solar cell 16), charge separation occurs in which the photoexcited electrons migrate to the n-type semiconductor layer side (the side of the reduction catalyst layer 20) while the holes generated in pairs with the photoexcited electrons migrate to the p-type semiconductor layer side (the side of the oxidation catalyst layer 19). As a result, an electromotive force is generated in the multi-Junction solar cell 17.

In this manner, the photoexcited electrons generated in the multi-Junction solar cell 17 are used for reduction reaction carried out in the reduction catalyst layer 20 which is an anode, and the holes are used for oxidation reaction carried out in the oxidation catalyst layer 19 which is cathode. Accordingly, as shown in FIG. 4, a reaction represented by the following Formula (1) takes place in the vicinity of the oxidation catalyst layer 19 while a reaction represented by the following Formula (2) takes place in the vicinity of the reduction catalyst layer 20. It is noted here, however, that the Formulae (1) and (2) represent reactions that take place when an acidic electrolyte solution having a hydrogen ion concentration of less than 7 is used.

$$2H_2O \rightarrow 4H^+ + O_2 + 4e^- \quad (1)$$

$$2CO_2 + 4H^+ + 4e^- \rightarrow 2CO + 2H_2O \quad (2)$$

As shown in the Formula (1), in the vicinity of the oxidation catalyst layer 19, $H_2O$ is oxidized is oxidized to produce $O_2$, $H^+$s and electrons. The $H^+$s produced on the side of the oxidation catalyst layer 19 migrate toward the reduction catalyst layer 20 through the below-described ion migration path.

As shown in the Formula (2), in the vicinity of the reduction catalyst layer 20, $CO_2$ is reduced by the migrated $H^+$s and the electrons to produce carbon monoxide (CO) and $H_2O$.

Meanwhile, as shown in FIG. 5, when a basic electrolyte solution having a hydrogen ion concentration of higher than 7 is used, a reaction represented by the following Formula (3) takes place in the vicinity of the oxidation catalyst layer 19 while a reaction represented by the following Formula (4) takes place in the vicinity of the reduction catalyst layer 20.

$$4OH^- \rightarrow O_2 + 2H_2O + 4e^- \quad (3)$$

$$2CO_2 + 2H_2O + 4e^- \rightarrow 2CO + 4OH^- \quad (4)$$

As shown in the Formula (4), in the vicinity of the reduction catalyst layer 20, a reduction reaction where $CO_2$ and $H_2O$ both accept electrons takes places, whereby carbon monoxide (CO) and $OH^-$s are produced. The $OH^-$s produced on the side of the reduction catalyst layer 20 migrate toward the oxidation catalyst layer 19 through the below-described ion migration path.

As shown in the Formula (3), in the vicinity of the oxidation catalyst layer 19, $OH^-$s are oxidized to produce $O_2$, $H_2O$ and electrons.

In this process, the multi-junction solar cell 17 is required to have an open-circuit voltage of not less than the potential difference between the standard redox potential of the oxidation reaction taking place in the oxidation catalyst layer 19 and the standard redox potential of the reduction reaction taking place in the reduction catalyst layer 20. For example, when the hydrogen ion concentration (pH) of a reaction solution is 0, the standard redox potential of the oxidation reaction of the Formula (1) is +1.23 [V], and the standard redox potential of the reduction reaction of the Formula (2) is −0.1 [V]. Accordingly, the multi-Junction solar cell 17 is required to have an open-circuit voltage of not less than 1.33 [V]. More preferably, the open-circuit voltage is required to be not less than the potential difference including an overvoltage. More specifically, for example, when the overvoltage in the oxidation reaction of the Formula (1) and that in the reduction reaction of the Formula (2) are both 0.2 [V], the open-circuit voltage is preferably not less than 1.73 [V].

Not only the reduction reactions from $CO_2$ to CO as represented by the Formulae (2) and (4) but also reduction reactions from $CO_2$ to HCOOH, HCHO, $CH_4$, $CH_3OH$, $C_2H_5OH$, $HOCH_2CH_2OH$ or the like are reactions which consume $H^+$ or produce $OH^-$. Therefore, if $H^+$ produced in the oxidation catalyst layer 19 cannot migrate to the reduction catalyst layer 20 serving as a counter electrode or if $OH^-$ produced in the reduction catalyst layer 20 cannot migrate to the oxidation catalyst layer 19 serving as a counter electrode, the overall reaction efficiency is reduced. In this respect, in the photochemical reactor according to the present embodiment, an ion migration path through which $H^+$ or $OH^-$ is allowed to migrate is formed and the transport of $H^+$ or $OH^-$ is thereby improved, so that a high photoreaction efficiency is realized.

3. Photochemical Reactor

A photochemical reactor comprising the photochemical reaction cell according to the present embodiment will now be described referring to FIGS. 6 to 10.

Figure 6:
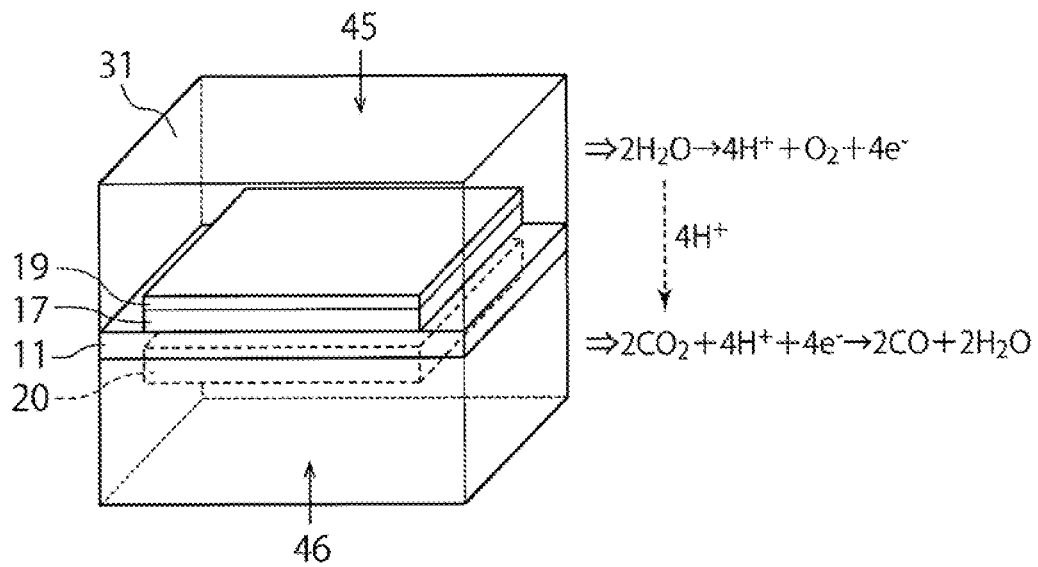
FIG. 6 is a cross-sectional view showing the structure of the photochemical reactor according to the present embodiment.
Figure 7:
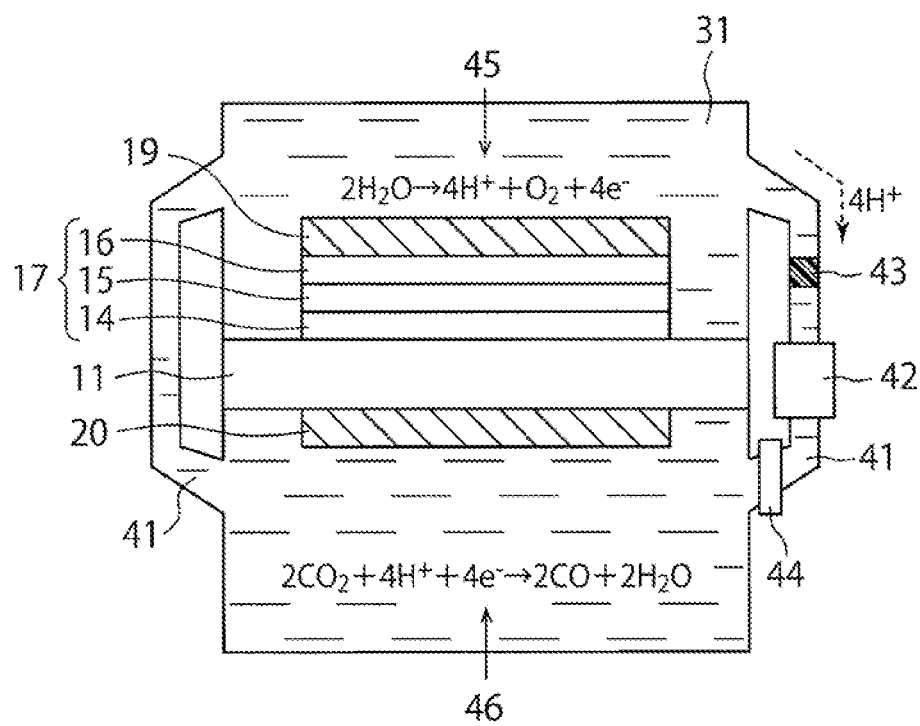
FIG. 7 is a cross-sectional view showing the structure of the photochemical reactor according to the present embodiment.

FIG. 6 is a perspective view showing the structure of the photochemical reactor according to the present embodiment. FIG. 7 is a cross-sectional view showing the structure of the photochemical reactor according to the present embodiment.

It is noted here that, in FIG. 6, the below-described ion migration path is omitted. These figures illustrate an example of redox reaction (the Formulae (1) and (2)) where an acidic electrolyte solution having a hydrogen ion concentration of less than 7 is used. When a basic electrolyte solution having a hydrogen ion concentration of higher than 7 is used, the redox reaction represented by the Formulae (3) and (4) takes place.

The photochemical reactor according to the present embodiment comprises: a photochemical reaction cell constituted by a laminate of the oxidation catalyst layer 19, the reduction catalyst layer 20 and the multi-Junction solar cell 17 formed therebetween; and an ion migration path through which ions are allowed to migrate between the oxidation catalyst layer 19 and the reduction catalyst layer 20. By this constitution, $H^+$ produced on the side of the oxidation catalyst layer 19 with high photoreaction efficiency can be transported to the reduction catalyst layer 20 and carbon dioxide can be decomposed by this $H^+$ on the side of the reduction catalyst layer 20.

As shown in FIGS. 6 and 7, the photochemical reactor according to the present embodiment comprises: a photochemical reaction cell; an electrolyzer 31 containing the photochemical reaction cell therein; and an electrolyzer flow path 41 as an ion migration path connected to the electrolyzer 31.

The photochemical reaction cell is formed in a flat-plate shape and divides the electrolyzer 31 into at least two parts by the substrate 11. That is, the electrolyzer 31 comprises: an electrolyzer for oxidation reaction 45, in which the oxidation catalyst layer 19 of the photochemical reaction cell is arranged; and an electrolyzer for reduction reaction 46, in which the reduction catalyst layer 20 of the photochemical reaction cell is arranged. Different electrolyte solutions can be supplied to these electrolyzer for oxidation reaction 45 and electrolyzer for reduction reaction 46.

The electrolyzer for oxidation reaction 45 is filled with, for example, a $H_2O$-containing liquid as an electrolyte solution. The oxidation catalyst layer 19 is immersed in this electrolyte solution. Examples of such an electrolyte solution include solutions containing an arbitrary electrolyte(s), and the electrolyte solution is preferably one which promotes oxidation reaction of $H_2O$. In the electrolyzer for oxidation reaction 45, $O_2$ and $H^+$ are produced through oxidation of $H_2O$ by the oxidation catalyst layer 19.

The electrolyzer for reduction reaction 46 is filled with, for example, a $CO_2$-containing liquid as an electrolyte solution. The reduction catalyst layer 20 is immersed in this electrolyte solution. In the reduction catalyst layer 20, the metal fine particles 107 and a substrate (charge collector 101) are connected via the spacer layer 106, and quaternary nitrogen cations 111 which promote $CO_2$ reduction reaction are fixed on the surfaces of the metal fine particles 107. The details of the electrolyte solution which has absorbed $CO_2$ and used for filling the electrolyzer for reduction reaction 46 will be described later. A reduction potential is applied to the metal fine particles 107. Thus, among electrolyte components, particularly $CO_2$-containing ions (for example, bicarbonate ion) or physically dissolved $CO_2$ molecules are subjected to electrostatic attraction in the vicinity of the metal fine particles 107 and the quaternary nitrogen cations 111 fixed thereon. As a result, at the interface of the catalyst and the electrolyte solution, an electrical double layer is formed by $CO_2$, the metal fine particles 107 and the quaternary nitrogen cations 111. At this interface, $CO_2$ reduction reaction proceeds based on a charge-transfer reaction.

In the electrolyzer for reduction reaction 46, a carbon compound is produced through reduction of $CO_2$ by the reduction catalyst layer 20. On the metal fine particles 107 having the quaternary nitrogen cations 111, the reduction product is modified by interactions of $CO_2$ with the quaternary nitrogen cations 111 and the metal fine particles 107. Specifically, $CO_2$ is converted into carbon monoxide (CO), formic acid (HCOOH), formaldehyde (HCHO), methanol ($CH_3OH$), acetic acid ($CH_3COOH$), acetaldehyde ($CH_3CHO$), ethanol ($CH_3CH_2OH$) and ethylene glycol ($HOCH_2CH_2OH$). Further, as a side reaction, hydrogen ($H_2$) may also be produced through reduction of water ($H_2O$).

It is preferred that the electrolyte solution in the electrolyzer for reduction reaction 46 lower the reduction potential of $CO_2$, have a high ionic conductivity and contain a $CO_2$ absorbent that absorbs $CO_2$. Examples of such an electrolyte solution include ionic liquids, which contain a salt of a cation such as an imidazolium ion or a pyridinium ion and an anion such as $BF_4^-$ or $PF_6^-$ and are in a liquid state over a wide temperature range, and aqueous solutions thereof. Examples of the electrolyte solution also include amine solutions of ethanolamine, imidazole, pyridine or the like, and aqueous solutions thereof. The amine may be any one of primary amines, secondary amines and tertiary amines. Examples of the primary amines include methylamine, ethylamine, propylamine, butylamine, pentylamine and hexylamine. The hydrocarbons of these amines may be substituted with an alcohol, a halogen or the like. Examples of an amine whose hydrocarbon is substituted include methanolamine, ethanolamine and chloromethylamine. The hydrocarbons may also contain an unsaturated bond. Such hydrocarbons are also applicable to secondary amines and tertiary amines. Examples of the secondary amines include dimethylamine, diethylamine, dipropylamine, dibutylamine, dipentylamine, dihexylamine, dimethanolamine, diethanolamine and dipropanolamine. The substituted hydrocarbons may be different, and this is also applicable to tertiary amines. Examples of amines with different hydrocarbons include methylethylamine and methylpropylamine. Examples of the tertiary amines include trimethylamine, triethylamine, tripropylamine, tributylamine, trihexylamine, trimethanolamine, triethanolamine, tripropanolamine, tributanolamine, tripropanolamine, trihexanolamine, methyldlethylamine and methyldipropylamine. Examples of the cation in the ionic liquids include a 1-ethyl-3-methylimidazolium ion, a 1-methyl-3-propylimidazolium ion, a 1-butyl-3-methylimidazole ion, a 1-methyl-3-pentylimidazolium ion and a 1-hexyl-3-methylimidazolium ion. These imidazolium ions may be substituted at the 2-position. Examples of such imidazolium ions include a 1-ethyl-2,3-dimethylimidazolium ion, a 1,2-dimethyl-3-propylimidazolium ion, a 1-butyl-2,3-dimethylimidazolium ion, 1,2-dimethyl-3-pentylimidazolium ion and a 1-hexyl-2,3-dimethylimidazolium ion. Examples of the pyridinium ion include methylpyridinium, ethylpyridinium, propylpyridinium, butylpyridinium, pentylpyridinium and hexylpyridinium ions. These imidazolium ions and pyridinium ions may be substituted at an alkyl group and may contain an unsaturated bond. Examples of the anion include a fluoride ion, a chloride ion, a bromide ion, an iodide ion, $BF_4^-$, $PF_6^-$, $CF_3COO^-$, $CF_3SO_3^-$, $NO_3^-$, $SCN^-$, $(CF_3SO_2)_3C^-$, a bis(trifluoromethoxysulfonyl)imide anion and a bis(perfluoroethylsulfonyl)imide anion. A dipolar ion in which a cation and an anion of an ionic liquid are bound via a hydrocarbon may also be used.

On the metal fine particles 107 having the quaternary nitrogen cations 111, reduction reactions proceed due to interactions of carbon dioxide with the quaternary nitrogen cations 111 and the metal fine particles 107. A two-electron reduction reaction of carbon dioxide yields formic acid in addition to carbon monoxide. A two-electron reduction reaction of formic acid yields formaldehyde. Further, a two-electron reduction reaction of formaldehyde yields methanol. When methanol is to be produced by the metal fine particles 107 having the quaternary nitrogen cations 111, formic acid or formaldehyde may be selected as a reactant in addition to carbon dioxide. Therefore, it is desired that at least one reactant selected from carbon dioxide, formic acid and formaldehyde be absorbed by the electrolyte solution in the electrolyzer for reduction reaction 46. For example, the electrolyte solution in the electrolyzer for reduction reaction 46 may be a sodium bicarbonate solution.

An eight-electron reduction reaction of carbon dioxide may yield acetic acid. An eight-electron reduction reaction of acetic acid yields acetaldehyde. Further, an eight-electron reduction reaction of acetaldehyde yields ethanol. When ethanol is to be produced by the metal fine particles 107 having the quaternary nitrogen cations 111, acetic acid or acetaldehyde may be selected as a reactant in addition to carbon dioxide. Therefore, at least one reactant selected from carbon dioxide, acetic acid and acetaldehyde may be absorbed by the electrolyte solution in the electrolyzer for reduction reaction 46.

Moreover, a two-electron reduction reaction of carbon dioxide may also yield oxalic acid. A two-electron reduction reaction of oxalic acid yields glyoxylic acid. A two-electron reduction reaction of glyoxylic acid yields glyoxal or glycolic acid. A further two-electron reduction reaction of glyoxal or glycolic acid yields glycolaldehyde. A still further two-electron reduction reaction of glycolaldehyde yields ethylene glycol. When ethylene glycol is to be produced by the metal fine particles 107 having the quaternary nitrogen cations 111, oxalic acid, glyoxylic acid or glycolaldehyde may be selected as a reactant in addition to carbon dioxide. Therefore, at least one reactant selected from oxalic acid, glyoxylic acid and glycolaldehyde may be absorbed by the electrolyte solution in the electrolyzer for reduction reaction 46.

The above-described reaction in which carbon dioxide is reduced and formic acid, formaldehyde and methanol are produced and the above-described reaction in which carbon dioxide is reduced and acetic acid, acetaldehyde and ethanol are produced are both dependent on the density of the organic modifying groups 103. Although the details thereof will be described later in the section of Examples, for example, when the density of the organic modifying groups 103 is $1 \times 10^{11}$ atoms/cm$^2$ or less, a reaction mainly yielding formic acid, formaldehyde and methanol takes place. Meanwhile, for example, when the density of the organic modifying groups 103 is $1 \times 10^{12}$ to $10^{15}$ atoms/cm$^2$, a reaction yielding acetic acid, acetaldehyde and ethanol in addition to formic acid, formaldehyde and methanol takes place. Particularly, when the density of the organic modifying groups 103 is $1 \times 10^{13}$ to $10^{15}$ atoms/cm$^2$, a reaction mainly yielding acetic acid, acetaldehyde and ethanol takes place. As shown in the below-described Examples, the relationships between the molecular density of an organic molecule and the products were discovered as a result of experimental studies conducted by the present inventors. In order to determine the binding state and density of the molecules of the spacer layer 106, an analysis based on X-ray photoelectron spectroscopy (XPS) was performed. The analysis conditions are shown below. The detection angle refers to an angle formed by the sample normal and the lens axis input by the detector.

Model used: Quantera-SXM, manufactured by Ulvac-Phi, Inc.

Source of irradiated X-ray: single-crystal-spectrum AlKα ray

Output: 50 W

Analyzed area: φ200 μm

Pass Energy:

Wide Scan—280.0 eV (1.0 eV/step)

Narrow Scan—69.0 eV (0.125 eV/step)

Detection angle: 45°

Charge neutralization electron gun: both Ar$^+$ and e$^-$

As charge correction (horizontal energy correction), the C—C/H bond component of C1s spectrum was adjusted to 284.80 eV.

The binding density (molecular density) of the molecules of the spacer layer 106 was calculated using the following formula (ii) from the number of S atoms, which was normalized with the number of Au atoms determined as a result of semiquantitative analysis (S/Au), with respect to the number of Au atoms per unit area roughly estimated by the following formula (i).

$$\text{Au(atoms/cm}^2\text{)=density(g/cm}^3\text{)} \times \text{detection depth (nm)} \times \text{N/Mw} \quad \text{(i)}$$

$$\text{Molecular density(atoms/cm}^2\text{)=Au(atoms/cm}^2\text{)} \times \text{S/Au (atomic number ratio)} \quad \text{(ii)}$$

Here, the density is 19.3 g/cm$^3$; the detection depth is 5 nm; N is Avogadro's number (atoms/mol); and Mw is 197 g/mol.

A reaction in which carbon dioxide is reduced and ethylene glycol is produced via oxalic acid, glycolic acid or glycolaldehyde is selectively carried out by allowing an electrode to maintain a reduction potential. That is, by maintaining a reduction potential on an electrode, since the organic modifying groups 103 are uniformly oriented, the reaction which yields ethylene glycol takes place. As for the electrolysis conditions for allowing an electrode to maintain a reduction potential, in a three-electrode cell in which an electrode substrate is used as a working electrode, a reference electrode is made of silver-silver chloride and a counter electrode is made of Pt, it is desired that an electric potential of −0.8 to 1.3 V be applied to the working electrode for not less than 5 hours. These conditions are maintained for preferably not less than 3 hours, more preferably not less than 1 hour. The orientation of the organic modifying groups 103 can be observed and evaluated under a scanning tunneling microscope (STM).

The temperature of the electrolyte solution filling the electrolyzer for oxidation reaction 45 and that of the electrolyte solution filling the electrolyzer for reduction reaction 46 may be the same or different in accordance with the use environment. For example, when the electrolyte solution used in the electrolyzer for reduction reaction 46 is a $CO_2$-containing amine absorption solution discharged from a factory, the temperature of the electrolyte solution is higher than the atmospheric temperature. In this case, the temperature of the electrolyte solution is 30° C. to 150° C., more preferably 40° C. to 120° C.

The electrolyzer flow path 41 is arranged, for example, on the lateral sides the electrolyzer 31. One end of the electrolyzer flow path 41 is connected to the oxidation reaction electrolytic tank 45, while the other end is connected to the electrolyzer for reduction reaction 46. That is, the electrolyzer flow path 41 connects the electrolyzer for oxidation reaction 45 and the electrolyzer for reduction reaction 46.

An ion exchange membrane 43 is filled into a part of the electrolyzer flow path 41 and allows only specific ions to pass therethrough. As a result, only the specific ions are allowed to migrate through the electrolyzer flow path 41 provided with the ion exchange membrane 43 while an electrolyte solution is separated between the electrolyzer for oxidation reaction 45 and the electrolyzer for reduction reaction 46. That is, the photochemical reactor has a partition wall structure which selectively allows materials to pass therethrough. The ion exchange membrane 43 is a proton exchange membrane and can allow $H^+$ produced in the electrolyzer for oxidation reaction 45 to migrate to the side of the electrolyzer for reduction reaction 46. More specifically, examples of the ion exchange membrane 43 include cation exchange membranes such as Nafion and Flemion, and anion exchange membranes such as Neosepta and Selemion. A bipolar membrane which is combination of anion exchange membrane and cation exchange membrane or a combination of plurality of ion exchange membranes is preferred in the view of life time and output since these membranes can be optimized to suit the electrolytes in the electrolyzers for reduction/oxidation reaction.

In place of the ion exchange membrane 43, for example, an agar such as a salt bridge through which ions can migrate and which can separate an electrolytic solution may also be used. Generally, good ion migration performance is attained by using a proton exchangeable solid polymer membrane represented by Nafion.

A circulation mechanism 42 such as a pump may also be arranged in the electrolyzer flow path 41. This can improve the circulation of ions ($H^+$) between the electrolyzer for oxidation reaction 45 and the electrolyzer for reduction reaction 46. Further, two electrolyzer flow path 41 may be arranged and, by using the circulation mechanism 42 provided in at least one of the electrolyzer flow paths 41, ions may be allowed to migrate from the electrolyzer for oxidation reaction 45 to the electrolyzer for reduction reaction 46 through one of the electrolyzer flow paths 41 as well as from the electrolyzer for reduction reaction 46 to the electrolyzer for oxidation reaction 45 through the other electrolyzer flow path 41. Moreover, a plurality of the circulation mechanisms 42 may be arranged. In order to reduce diffusion of ions and circulate ions more efficiently, a plurality of (three or more) electrolyzer flow paths 41 may be arranged as well. Furthermore, by transporting a liquid, retention of generated gas bubbles on the electrode surface and the electrolyte layer surface may be prevented and an efficiency reduction and light intensity distribution caused by scattering of sunlight due to gas bubbles may be inhibited.

In addition, by utilizing the heat generated by irradiation of the surface of the multi-junction solar cell 17 with a light and thereby creating a temperature difference in the electrolyte solution, dispersion of ions may be reduced and ions may thus be circulated more efficiently. In other words, movement of ions can be facilitated by convection other than diffusion of ions.

Meanwhile, a temperature control mechanism 44 which adjusts the temperature of the electrolyte solution can be arranged in the electrolyzer flow path 41 or the electrolyzer 31 so as to control the solar cell performance and the catalyst performance by temperature control. This enables to make the temperature of the reaction system uniform for the purposes of, for example, stabilizing and improving the performances of the solar cell and catalysts. In addition, for system stabilization, a temperature increase can be inhibited. By controlling the temperature, the selectivity of the solar cell and catalysts can be changed, so that the resulting product can also be controlled.

In this example, the ends of the substrate 11 protrude further than the ends of the multi-Junction solar cell 17, the oxidation catalyst layer 19 and the reduction catalyst layer 20; however, the configuration of the substrate 11 is not restricted thereto. The substrate 11, the multi-Junction solar cell 17, the oxidation catalyst layer 19 and the reduction catalyst layer 20 may all be in a flat plate form having the same area.

Next, modification examples of the photochemical reactor according to the present embodiment will be described.

Figure 8:
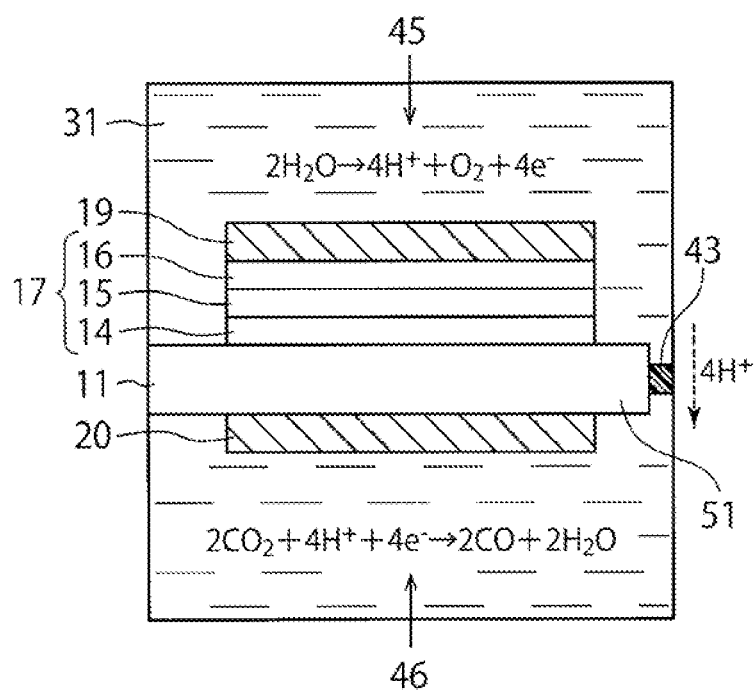
FIG. 8 is a cross-sectional view showing another structure of the photochemical reactor according to the present embodiment.
Figure 9:
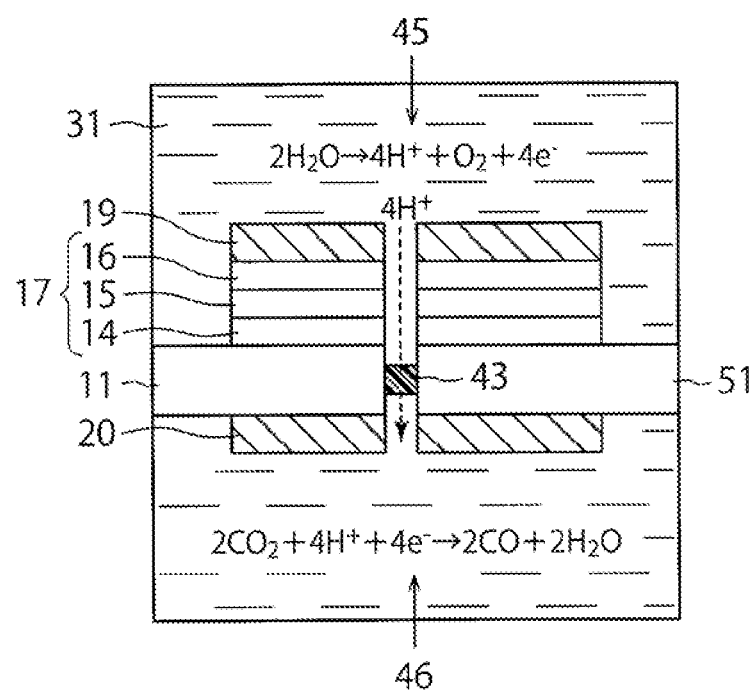
FIG. 9 is a cross-sectional view showing yet another structure of the photochemical reactor according to the present embodiment.

FIGS. 8 and 9 are cross-sectional views showing the structures of Modification Examples 1 and 2 of the photochemical reactor according to the present embodiment. In these Modification Examples of the photochemical reactor according to the present, differences from the above-described structure will be mainly described.

As shown in FIG. 8, Modification Example 1 of the photochemical reactor according to the present embodiment comprises: a photochemical reaction cell; the electrolyzer 31 containing the photochemical reaction cell therein; and an opening 51 which is formed on the substrate 11 as an ion migration path.

The opening 51 is arranged such that, for example, it penetrates through one end of the substrate 11 from the side of the electrolyzer for oxidation reaction 45 to the side of the electrolyzer for reduction reaction 46. By this constitution, the opening 51 connects the electrolyzer for oxidation reaction 45 and the electrolyzer for reduction reaction 46.

The ion exchange membrane 43 is filled into a part of this opening 51 and allows only specific ions to pass therethrough. As a result, only the specific ions are allowed to migrate through the opening 51 provided with the ion exchange membrane 43 while an electrolyte solution is separated between the electrolyzer for oxidation reaction 45 and the electrolyzer for reduction reaction 46.

As shown in FIG. 9, Modification Example 2 of the photochemical reactor according to the present embodiment comprises: a photochemical reaction cell; the electrolyzer 31 containing the photochemical reaction cell therein; the multi-Junction solar cell 17; the oxidation catalyst layer 19; the reduction catalyst layer 20; and the opening 51 which is formed on the substrate 11 as an ion migration path.

The opening 51 is arranged such that, for example, it penetrates through the substrate 11, the multi-junction solar cell 17, the oxidation catalyst layer 19 and the reduction catalyst layer 20 from the side of the electrolyzer for oxidation reaction 45 to the side of the electrolyzer for reduction reaction 46. By this constitution, the opening 51 connects the electrolyzer for oxidation reaction 45 and the electrolyzer for reduction reaction 46.

The ion exchange membrane 43 is filled into a part of this opening 51 and allows only specific ions to pass therethrough. As a result, only the specific ions are allowed to migrate through the opening 51 provided with the ion exchange membrane 43 while an electrolyte solution is separated between the electrolyzer for oxidation reaction 45 and the electrolyzer for reduction reaction 46.

In FIG. 9, the ion exchange membrane 43 is formed in a part of the opening 51; however, the ion exchange membrane 43 may also be formed in such a manner to fill up the opening 51.

EXAMPLES

Example 1

A reduction catalyst having the structure shown in FIG. 2 was produced. A metal layer comprises Au was used as the conductive layer 102; 5,5'-bis(mercaptomethyl)-2,2'-blpyridine was used as the precursor compound of the spacer layer 106 and the modified organic groups 103; and Au particles having an average size of 3 nm were used as the metal fine particles 107.

(Preparation of $CO_2$ Reduction Catalyst)

First, on the surface of the charge collector 101 constituted by a stainless steel substrate (150 mm×250 mm, thickness=150 μm), the conductive layer 102 is formed by sputtering. This conductive layer 102 has a uniform thickness of 100 nm in the planar direction. The conductive layer 102 is a metal layer constituted by Au.

Subsequently, the spacer layer 106 is formed on the surface of the conductive layer 102. The spacer layer 106 is formed by immersing the conductive layer 102 in 10 mL of 5,5'-bis(mercaptomethyl)-2,2'-bipyridine solution (1 mM ethanol solution) for 48 hours.

The formation of the spacer layer 106 is confirmed by measuring and comparing the electrochemical response of the substrate before and after the step of forming the spacer layer 106. More specifically, a three-electrode cell in which the substrate having an Au layer formed thereon, an Ag/AgCl electrode and a Pt electrode are used as a working electrode, a reference electrode and a counter electrode, respectively, is assembled. Then, in a 0.2 M aqueous potassium chloride (KCl) solution In which 1 mM of hexaammineruthenlum (III) chloride ($[Ru(NH_3)_6]Cl_3$) is dissolved, the response of the redox current of hexaammineruthenium (III) anion is observed at a scanning rate of 100 mV/sec in an electric potential range of −0.5 to +0.1 V with respect to the Ag/AgCl electrode. Although a reversible redox current of redox species is observed before the formation of the spacer layer 106, the redox reaction is not observed after the formation of the spacer layer 106. Disappearance of electrochemical redox reaction of hexaammineruthenium (III) cation is believed to be attributed to a shielding effect based on the formation of the spacer layer 106.

Next, the metal fine particles 107 constituted by Au are fixed on the surface of the spacer layer 106. The metal fine particles 107 are fixed by immersing the substrate having the spacer layer 106 formed thereon for 12 hours in an aqueous solution in which the metal fine particles 107 are dispersed. The metal fine particles 107 are Au nanoparticles having an average particle size, which is evaluated using a particle size distribution meter (Zetasizer Nano ZS, manufactured by Malvern Instruments Ltd.), of 3 nm.

The fixation of the metal fine particles 107 is confirmed by measuring and comparing the electrochemical response of the substrate before and after the step of fixing the metal fine particles 107. More specifically, a three-electrode cell in which the substrate having the spacer layer 106 formed thereon, an Ag/AgCl electrode and a Pt electrode are used as a working electrode, a reference electrode and a counter electrode, respectively, is assembled. Then, in a 0.2 M aqueous potassium chloride (KCl) solution in which 1 mM of hexaammineruthenium (III) chloride ($[Ru(NH_3)_6]Cl_3$) is dissolved, the response of the redox current of hexaammineruthenium (III) anion is observed at a scanning rate of 100 mV/sec in an electric potential range of −0.5 to +0.1 V with respect to the Ag/AgCl electrode. Although a reversible redox current of redox species is not observed before the fixation of the metal fine particles 107 due to the shielding effect exerted by the spacer layer 106, the redox reaction is again observed after the fixation of the metal fine particles 107. The fixation of the metal fine particles 107 on the surface of the spacer layer 106 can also be confirmed by observation of the electrochemical redox reaction of hexaammineruthenium (III) cation.

Examples 2 to 10

The reduction catalysts of Examples 2 to 10 were produced in the same manner as in Example 1, except that the metal layer was constituted by the respective materials shown in Table 1. In these Examples, the $CO_2$ reduction performance of each $CO_2$ reduction catalyst was evaluated by electrochemical measurement in the same manner as in Example 1. The results thereof are shown in Table 1.

Examples 11 to 22

The $CO_2$ reduction catalysts of Examples 11 to 22 represent cases where the conductive layer 102 was comprises Au and directly modified with the organic modifying groups 103 without arranging the spacer layer 106 and the metal fine particles 107 therebetween. As the material of the organic layer, the respective materials shown in Table 2 were used. In these Examples, the $CO_2$ reduction performance of each $CO_2$ reduction catalyst was evaluated by electrochemical measurement in the same manner as in Example 1. The results thereof are shown in Table 2.

Comparative Example 1

The $CO_2$ reduction catalyst of Comparative Example 1 represents a case where the conductive layer 102 was comprises Au and the spacer layer 106, the metal fine particles 107 and the organic modifying groups 103 were not arranged. The $CO_2$ reduction performance of the $CO_2$ reduction catalyst according to Comparative Example 1 was evaluated by electrochemical measurement in the same manner as in Example 1.

Comparative Examples 2 to 10

The reduction catalysts of Comparative Examples 2 to 10 were produced in the same manner as in Example 1, except that the conductive layer was constituted by the respective materials shown in Table 2. In these Comparative Examples, the $CO_2$ reduction performance of each $CO_2$ reduction catalyst was evaluated by electrochemical measurement in the same manner as in Example 1. The results thereof are shown in Table 2.

(Measurement of $CO_2$ Reduction Performance)

The $CO_2$ reduction performance of the $CO_2$ reduction catalyst ($CO_2$ reduction electrode) according to Example 1 was evaluated by electrochemical measurement as follows.

A 5% aqueous $NaHCO_3$ solution was selected as a $CO_2$ absorbent and an electrolyte solution for $CO_2$ reduction. This 5% aqueous $NaHCO_3$ solution was bubbled with 100% $CO_2$ gas and $CO_2$ was thereby dissolved therein until the concentration of $CO_2$ absorbed by the solution reached saturation. It was judged that the concentration reached saturation when the inlet and outlet concentrations of the $CO_2$ gas to be absorbed by the 5% aqueous $NaHCO_3$ solution were measured to be the same.

The reduction performance of the $CO_2$ reduction catalyst was evaluated by an electrochemical analyzer (Solartron Cell Test System, manufactured by TOYO Corporation). Evaluation of the $CO_2$ reduction electrode was performed using an H-type cell, and a three-electrode cell in which the $CO_2$ reduction electrode, an Ag/AgCl electrode and a Pt electrode were used as a working electrode, a reference electrode and a counter electrode, respectively, was assembled. The Pt electrode was arranged in a cell partitioned by a glass filter. During the electrolysis evaluation, the electrolysis chamber of the working electrode was subjected to bubbling with 100% $CO_2$ gas and the electrolyte solution in the electrolysis chamber of the working electrode was stirred at a rate of 800 rpm using a magnetic stirrer.

In this electrochemical analyzer, the current flowing in the working electrode and the current flowing in the counter electrode were measured when constant-current electrolysis was performed such that the electric potential applied to the working electrode was −1.2 V with respect to the Ag/AgCl electrode. The electrolysis was performed for 60 minutes. In addition, reduction products generated in this process were analyzed. Gas components (hydrogen gas and carbon monoxide gas) were analyzed by gas chromatography (Varian Micro GC CP4900). Further, as reduced substances dissolved in the electrolyte solution, formic acid, formaldehyde, methanol, acetic acid, acetaldehyde, ethanol, oxalic acid, glyoxylic acid, glycolaldehyde and ethylene glycol were analyzed. Formic acid, acetic acid, oxalic acid and glyoxylic acid were analyzed by ion chromatography (DX-320, manufactured by Thermo Fisher Scientific K.K.); formaldehyde, acetaldehyde and glycolaldehyde were analyzed by high-performance liquid chromatography (ACQUITY UPLC, manufactured by Waters, Inc.); methanol and ethanol were analyzed by gas chromatography-mass spectrometry (6890/5975, manufactured by Agilent Technologies); and ethylene glycol was analyzed by gas chromatography (6890, manufactured by Agilent Technologies). The Faraday efficiency (product selectivity) was determined based on the current consumed by reduction reaction at the working electrode and the quantitative analysis of each generated reduction product. The reason why the thus determined Faraday efficiency values do not add up to 100% is because some of the loaded electrons were consumed by hydrogen generation and Joule heat of side reactions.

TABLE 1

| | Material of conductive layer | Material of spacer layer/ Material of organic layer | Selectivity (%) | | | | | | |
|---|---|---|---|---|---|---|---|---|---|
| | | | Carbon monoxide | Formic acid | Formaldehyde | Methanol | Acetic acid | Acetaldehyde | Ethanol |
| Example 1 | Au | 5,5'-bis(mercaptomethyl)-2,2'-bipyridine | 2 | 2 | 1 | 2 | 1 | 2 | 1 |
| Example 2 | Ag | 5,5'-bis(mercaptomethyl)-2,2'-bipyridine | 2 | 2 | 1 | 2 | 1 | 2 | 1 |
| Example 3 | Cu | 5,5'-bis(mercaptomethyl)-2,2'-bipyridine | 2 | 2 | 1 | 2 | 1 | 2 | 1 |
| Example 4 | Zn | 5,5'-bis(mercaptomethyl)-2,2'-bipyridine | 2 | 2 | 1 | 2 | 1 | 2 | 1 |
| Example 5 | Pt | 5,5'-bis(mercaptomethyl)-2,2'-bipyridine | 2 | 1 | 1 | 3 | 1 | 2 | 1 |
| Example 6 | Fe | 5,5'-bis(mercaptomethyl)-2,2'-bipyridine | 2 | 1 | 1 | 1 | 2 | 1 | 2 |
| Example 7 | Ti | 5,5'-bis(mercaptomethyl)-2,2'-bipyridine | 2 | 2 | 1 | 2 | 1 | 1 | 1 |
| Example 8 | Ni | 5,5'-bis(mercaptomethyl)-2,2'-bipyridine | 2 | 1 | 1 | 2 | 1 | 1 | 3 |
| Example 9 | Sn | 5,5'-bis(mercaptomethyl)-2,2'-bipyridine | 2 | 1 | 1 | 3 | 1 | 1 | 2 |
| Example 10 | In | 5,5'-bis(mercaptomethyl)-2,2'-bipyridine | 2 | 1 | 1 | 1 | 1 | 1 | 2 |

| | Material of conductive layer | Material of spacer layer/ Material of organic layer | Selectivity (%) | | | | CO2 reduction rate |
|---|---|---|---|---|---|---|---|
| | | | Oxalic acid | Glycolic acid | Glycolaldehyde | Ethylene glycol | |
| Example 1 | Au | 5,5'-bis(mercaptomethyl)-2,2'-bipyridine | 1 | 1 | 1 | 58 | 72 |

TABLE 1-continued

| | Material of conductive layer | Material of spacer layer/ Material of organic layer | | | | | |
|---|---|---|---|---|---|---|---|
| Example 2 | Ag | 5,5'-bis(mercaptomethyl)-2,2'-bipyridine | 1 | 1 | 1 | 57 | 71 |
| Example 3 | Cu | 5,5'-bis(mercaptomethyl)-2,2'-bipyridine | 1 | 1 | 1 | 55 | 69 |
| Example 4 | Zn | 5,5'-bis(mercaptomethyl)-2,2'-bipyridine | 1 | 1 | 1 | 53 | 67 |
| Example 5 | Pt | 5,5'-bis(mercaptomethyl)-2,2'-bipyridine | 1 | 1 | 1 | 55 | 69 |
| Example 6 | Fe | 5,5'-bis(mercaptomethyl)-2,2'-bipyridine | 1 | 1 | 1 | 57 | 70 |
| Example 7 | Ti | 5,5'-bis(mercaptomethyl)-2,2'-bipyridine | 1 | 1 | 1 | 56 | 69 |
| Example 8 | Ni | 5,5'-bis(mercaptomethyl)-2,2'-bipyridine | 1 | 1 | 1 | 60 | 74 |
| Example 9 | Sn | 5,5'-bis(mercaptomethyl)-2,2'-bipyridine | 1 | 1 | 1 | 48 | 62 |
| Example 10 | In | 5,5'-bis(mercaptomethyl)-2,2'-bipyridine | 1 | 1 | 1 | 46 | 58 |

TABLE 2

| | Material of conductive layer | Material of spacer layer/ Material of organic layer | Selectivity (%) | | | | | | |
|---|---|---|---|---|---|---|---|---|---|
| | | | Carbon monoxide | Formic acid | Formaldehyde | Methanol | Acetic acid | Acetaldehyde | Ethanol |
| Example 11 | Au | 5,5'-bis(mercaptomethyl)-2,2'-bipyridine | 2 | 2 | 1 | 2 | 36 | 5 | 7 |
| Example 12 | Ag | 5,5'-bis(mercaptomethyl)-2,2'-bipyridine | 2 | 2 | 1 | 2 | 35 | 5 | 7 |
| Example 13 | Cu | 5,5'-bis(mercaptomethyl)-2,2'-bipyridine | 2 | 2 | 1 | 2 | 32 | 5 | 7 |
| Example 14 | Zn | 5,5'-bis(mercaptomethyl)-2,2'-bipyridine | 2 | 2 | 1 | 2 | 34 | 5 | 7 |
| Example 15 | Pt | 5,5'-bis(mercaptomethyl)-2,2'-bipyridine | 2 | 2 | 1 | 3 | 36 | 5 | 7 |
| Example 16 | Fe | 5,5'-bis(mercaptomethyl)-2,2'-bipyridine | 2 | 2 | 1 | 4 | 34 | 5 | 7 |
| Example 17 | Ti | 5,5'-bis(mercaptomethyl)-2,2'-bipyridine | 2 | 2 | 1 | 5 | 40 | 5 | 7 |
| Example 18 | Ni | 5,5'-bis(mercaptomethyl)-2,2'-bipyridine | 2 | 2 | 1 | 6 | 36 | 5 | 7 |
| Example 19 | Sn | 5,5'-bis(mercaptomethyl)-2,2'-bipyridine | 2 | 2 | 1 | 7 | 32 | 5 | 7 |
| Example 20 | In | 5,5'-bis(mercaptomethyl)-2,2'-bipyridine | 2 | 2 | 1 | 8 | 34 | 5 | 7 |
| Example 21 | Au | 3-mercaptopyridine | | | | | | | |
| Example 22 | Au | 4-mercaptopyridine | | | | | | | |
| Comparative Example 1 | Au | — | 30 | 0 | 0 | 0 | 0 | 0 | 0 |
| Comparative Example 2 | Ag | — | 30 | 0 | 0 | 0 | 0 | 0 | 0 |
| Comparative Example 3 | Cu | — | 25 | 0 | 0 | 0 | 0 | 0 | 0 |
| Comparative Example 4 | Zn | — | 10 | 0 | 0 | 0 | 0 | 0 | 0 |
| Comparative Example 5 | Pt | — | 0 | 0 | 0 | 0 | 0 | 0 | 0 |
| Comparative Example 6 | Fe | — | 0 | 0 | 0 | 0 | 0 | 0 | 0 |
| Comparative Example 7 | Ti | — | 0 | 0 | 0 | 0 | 0 | 0 | 0 |
| Comparative Example 8 | Ni | — | 0 | 0 | 0 | 0 | 0 | 0 | 0 |
| Comparative Example 9 | Sn | — | 0 | 0 | 0 | 0 | 0 | 0 | 0 |
| Comparative Example 10 | In | — | 0 | 0 | 0 | 0 | 0 | 0 | 0 |

| | Material of conductive layer | Material of spacer layer/ Material of organic layer | Selectivity (%) | | | | $CO_2$ reduction rate |
|---|---|---|---|---|---|---|---|
| | | | Oxalic acid | Glycolic acid | Glycolaldehyde | Ethylene glycol | |
| Example 11 | Au | 5,5'-bis(mercaptomethyl)-2,2'-bipyridine | 1 | 1 | 1 | 7 | 65 |

TABLE 2-continued

| | | | | | | | |
|---|---|---|---|---|---|---|---|
| Example 12 | Ag | 5,5'-bis(mercaptomethyl)-2,2'-bipyridine | 1 | 1 | 1 | 7 | 64 |
| Example 13 | Cu | 5,5'-bis(mercaptomethyl)-2,2'-bipyridine | 1 | 1 | 1 | 7 | 61 |
| Example 14 | Zn | 5,5'-bis(mercaptomethyl)-2,2'-bipyridine | 1 | 1 | 1 | 7 | 63 |
| Example 15 | Pt | 5,5'-bis(mercaptomethyl)-2,2'-bipyridine | 1 | 1 | 1 | 7 | 65 |
| Example 16 | Fe | 5,5'-bis(mercaptomethyl)-2,2'-bipyridine | 1 | 1 | 1 | 7 | 63 |
| Example 17 | Ti | 5,5'-bis(mercaptomethyl)-2,2'-bipyridine | 1 | 1 | 1 | 7 | 69 |
| Example 18 | Ni | 5,5'-bis(mercaptomethyl)-2,2'-bipyridine | 1 | 1 | 1 | 7 | 65 |
| Example 19 | Sn | 5,5'-bis(mercaptomethyl)-2,2'-bipyridine | 1 | 1 | 1 | 7 | 61 |
| Example 20 | In | 5,5'-bis(mercaptomethyl)-2,2'-bipyridine | 1 | 1 | 1 | 7 | 63 |
| Example 21 | Au | 3-mercaptopyridine | | | | | 64* |
| Example 22 | Au | 4-mercaptopyridine | | | | | 84* |
| Comparative Example 1 | Au | — | 0 | 0 | 0 | 0 | 30 |
| Comparative Example 2 | Ag | — | 0 | 0 | 0 | 0 | 30 |
| Comparative Example 3 | Cu | — | 0 | 0 | 0 | 0 | 25 |
| Comparative Example 4 | Zn | — | 0 | 0 | 0 | 0 | 10 |
| Comparative Example 5 | Pt | — | 0 | 0 | 0 | 0 | 0 |
| Comparative Example 6 | Fe | — | 0 | 0 | 0 | 0 | 0 |
| Comparative Example 7 | Ti | — | 0 | 0 | 0 | 0 | 0 |
| Comparative Example 8 | Ni | — | 0 | 0 | 0 | 0 | 0 |
| Comparative Example 9 | Sn | — | 0 | 0 | 0 | 0 | 0 |
| Comparative Example 10 | In | — | 0 | 0 | 0 | 0 | 0 |

*calculated based on ethylene glycol alone

In all of Examples 1 to 22, high $CO_2$ reduction performance was attained, and ethylene glycol, acetic acid, acetaldehyde and ethanol were produced in large amounts with high selectivity for ethylene glycol. These results were obtained because the organic modifying groups not only promoted the $CO_2$ reduction reaction but also contributed to the selectivity.

Comparative Examples 1 to 10 are cases where no organic layer (organic modifying group) was arranged. The $CO_2$ reduction performance was low in all of Comparative Examples 1 to 4, and reduction of $CO_2$ was not observed in Comparative Examples 5 to 10.

It is noted here that, in the tables, a selectivity of 0 means that the corresponding item was below the measurement limit.

Example 23

The reduction catalyst of Example 23 was produced by forming a metal layer from Au, using 5,5'-bis(mercaptomethyl)-2,2'-bipyridine as the material of a spacer layer and an organic layer and applying particles of 3 nm in average particles size as metal fine particles. The average particle size of the metal fine particles was measured by a particle size distribution meter (Zetasizer Nano ZS, manufactured by Malvern Instruments Ltd.).

First, on the surface of the charge collector 101 constituted by a stainless steel substrate (150 mm×250 mm, thickness=150 μm), the conductive layer 102 is formed by sputtering. This conductive layer 102 has a uniform thickness of 100 nm in the planar direction. The conductive layer 102 is a metal layer constituted by Au.

Subsequently, the spacer layer is formed on the surface of the conductive layer. The spacer layer is formed by immersing the conductive layer 102 in 10 mL of 5,5'-bis(mercaptomethyl)-2,2'-bipyridine solution (1 mM ethanol solution) for 48 hours.

The formation of the spacer layer is confirmed by measuring and comparing the electrochemical response of the substrate before and after the step of forming the spacer layer. More specifically, a three-electrode cell in which the substrate having an Au layer formed thereon, an Ag/AgCl electrode and a Pt electrode are used as a working electrode, a reference electrode and a counter electrode, respectively, is assembled. Then, in a 0.2 M aqueous potassium chloride (KCl) solution in which 1 mM of hexaammineruthenium (III) chloride ([Ru(NH$_3$)$_6$]Cl$_3$) is dissolved, the response of the redox current of hexaammineruthenium (III) anion is observed at a scanning rate of 100 mV/sec in an electric potential range of −0.5 to +0.1 V with respect to the Ag/AgCl electrode. Although a reversible redox current of redox species is observed before the formation of the spacer layer 106, the redox reaction is not observed after the formation of the spacer layer 106. Disappearance of electrochemical redox reaction of hexaammineruthenium (III) cation is believed to be attributed to a shielding effect based on the formation of the spacer layer.

Next, organic modifying groups were fixed on the surfaces of the metal fine particles by immersing the charge collector having the metal fine particles fixed thereon into 10 ml of 5,5'-bis(mercaptomethyl)-2,2'-bipyridine solution (1 mM ethanol solution) for 48 hours.

The fixation of the organic modifying groups on the surfaces of the metal fine particles was confirmed in the same manner as in the above-described method for confirming the fixation of the spacer layer.

Thereafter, in order to increase the amount of fixed metal fine particles, the steps of fixing the metal fine particles and fixing the organic modifying groups were repeated 10 times.

Examples 24 to 38

The reduction catalysts of Examples 24 to 38 were produced in the same manner as in Example 23 except that the materials of the spacer layer and the organic layer were changed as shown in Table 3, and the $CO_2$ reduction performance was evaluated by the same electrochemical measurement method as in Example 23.

The results of evaluating the reduction catalysts of Examples 23 to 38 are shown in Table 3.

In all of Examples 23 to 38, high $CO_2$ reduction performance was attained and ethylene glycol was produced with high selectivity. These results were obtained because the organic modifying groups not only promoted the $CO_2$ reduction reaction but also contributed to the selectivity for ethylene glycol production.

TABLE 3

| | Material of spacer layer/ Material of organic layer | Selectivity (%) | | | | | | |
|---|---|---|---|---|---|---|---|---|
| | | Carbon monoxide | Formic acid | Formaldehyde | Methanol | Acetic acid | Acetaldehyde | Ethanol |
| Example 23 | 5,5'-bis(mercaptomethyl)-2,2'-bipyridine | 2 | 2 | 1 | 2 | 1 | 2 | 1 |
| Example 24 | 4,5'-bis(mercaptomethyl)-2,2'-bipyridine | 2 | 2 | 1 | 2 | 1 | 2 | 1 |
| Example 25 | 3,5'-bis(mercaptomethyl)-2,2'-bipyridine | 2 | 2 | 1 | 2 | 1 | 2 | 1 |
| Example 26 | 5-(mercaptomethyl)-5'-(mercaptoethyl)-2,2'-bipyridine | 2 | 2 | 1 | 2 | 1 | 2 | 1 |
| Example 27 | 5-(mercaptomethyl)-4'-(mercaptoethyl)-2,2'-bipyridine | 2 | 1 | 1 | 3 | 1 | 2 | 1 |
| Example 28 | 4-(mercaptomethyl)-5'-(mercaptoethyl)-2,2'-bipyridine | 2 | 1 | 1 | 1 | 2 | 1 | 2 |
| Example 29 | 5,5'-bis(mercaptoethyl)-2,2'-bipyridine | 2 | 2 | 1 | 2 | 1 | 1 | 1 |
| Example 30 | 5,5'-bis(mercaptopropyl)-2,2'-bipyridine | 2 | 1 | 1 | 2 | 1 | 1 | 3 |
| Example 31 | 5-(mercaptomethyl)-5'-(mercaptopropyl)-2,2'-bipyridine | 2 | 1 | 1 | 3 | 1 | 1 | 2 |
| Example 32 | 5-(mercaptopropyl)-5'-(mercaptoethyl)-2,2'-bipyridine | 2 | 1 | 1 | 1 | 1 | 1 | 2 |
| Example 33 | 5,5'-bis(mercaptomethyl)-2,2'-bipyridine | 2 | 1 | 1 | 2 | 2 | 1 | 2 |
| Example 34 | 3,8'-bis(mercaptomethyl)-1,10'-phenanthroline | 1 | 1 | 1 | 1 | 1 | 1 | 2 |
| Example 35 | 3,8'-bis(mercaptomethyl)-5,6-dihydro-1,10'-phenanthroline | 3 | 2 | 1 | 2 | 1 | 1 | 1 |
| Example 36 | 2,5'-bis(mercaptomethyl)-5-methyl-5H-cyclopenta[2,1-b:3,4-b']dipyridine | 2 | 1 | 1 | 3 | 1 | 2 | 1 |
| Example 37 | 1,2-bis(3-mercaptomethyl)-2-pyridyl)-1-methyl-ethane | 1 | 1 | 1 | 2 | 2 | 1 | 1 |
| Example 38 | 4,4'-bis(mercaptomethyl)-2,2'-bipyridine | 5 | 1 | 1 | 1 | 1 | 1 | 1 |

| | Material of spacer layer/ Material of organic layer | Selectivity (%) | | | | CO2 reduction rate |
|---|---|---|---|---|---|---|
| | | Oxalic acid | Glycolic acid | Glycolaldehyde | Ethylene glycol | |
| Example 23 | 5,5'-bis(mercaptomethyl)-2,2'-bipyridine | 1 | 1 | 1 | 70 | 84 |
| Example 24 | 4,5'-bis(mercaptomethyl)-2,2'-bipyridine | 1 | 1 | 1 | 61 | 75 |
| Example 25 | 3,5'-bis(mercaptomethyl)-2,2'-bipyridine | 1 | 1 | 1 | 57 | 71 |
| Example 26 | 5-(mercaptomethyl)-5'-(mercaptoethyl)-2,2'-bipyridine | 1 | 1 | 1 | 63 | 77 |
| Example 27 | 5-(mercaptomethyl)-4'-(mercaptoethyl)-2,2'-bipyridine | 1 | 1 | 1 | 61 | 76 |
| Example 28 | 4-(mercaptomethyl)-5'-(mercaptoethyl)-2,2'-bipyridine | 1 | 1 | 1 | 57 | 70 |
| Example 29 | 5,5'-bis(mercaptoethyl)-2,2'-bipyridine | 1 | 1 | 1 | 46 | 59 |
| Example 30 | 5,5'-bis(mercaptopropyl)-2,2'-bipyridine | 1 | 1 | 1 | 39 | 53 |
| Example 31 | 5-(mercaptomethyl)-5'-(mercaptopropyl)-2,2'-bipyridine | 1 | 1 | 1 | 51 | 65 |
| Example 32 | 5-(mercaptopropyl)-5'-(mercaptoethyl)-2,2'-bipyridine | 1 | 1 | 1 | 48 | 60 |

TABLE 3-continued

| | | | | | | |
|---|---|---|---|---|---|---|
| Example 33 | 5,5'-bis(mercaptomethyl)-2,2'-bipyridine | 1 | 1 | 1 | 39 | 53 |
| Example 34 | 3,8'-bis(mercaptomethyl)-1,10'-phenanthroline | 1 | 1 | 1 | 50 | 61 |
| Example 35 | 3,8'-bis(mercaptomethyl)-5,6-dihydro-1,10'-phenanthroline | 1 | 1 | 1 | 47 | 61 |
| Example 36 | 2,5'-bis(mercaptomethyl)-5-methyl-5H-cyclopenta[2,1-b:3,4-b']dipyridine | 1 | 1 | 1 | 52 | 66 |
| Example 37 | 1,2-bis(3-mercaptomethyl)-2-pyridyl)-1-methyl-ethane | 1 | 1 | 1 | 43 | 55 |
| Example 38 | 4,4'-bis(mercaptomethyl)-2,2'-bipyridine | 1 | 1 | 1 | 60 | 74 |

Example 39

A reduction catalyst was produced in the same manner as in Example 11, except that 5,5'-bis(mercaptomethyl)-2,2'-bipyridine was used as the material of the spacer layer and the organic layer. For this electrode, using a 5% aqueous $NaHCO_3$ solution as a $CO_2$ absorbent and an electrolyte solution for $CO_2$ reduction, the $CO_2$ reduction performance was evaluated by the above-described method.

Example 40

A reduction catalyst was produced in the same manner as in Example 39 except that an aqueous triethanolamine solution (50-wt % aqueous solution, $CO_2$-saturated absorbent solution) was used as the electrolyte solution, and the $CO_2$ reduction performance was evaluated by the above-described method.

Example 41

A reduction catalyst was produced in the same manner as in Example 39 except that a 90% aqueous 1-ethyl-3-methylimidazolium tetrafluoroborate solution (EMIBF4, $CO_2$-saturated absorbent solution) was used as the electrolyte solution, and the $CO_2$ reduction performance was evaluated by the above-described method.

Comparative Example 11

A catalyst containing no spacer organic molecule, metal fine particle or modified organic molecule was produced in the same manner as in Comparative Example 1. Using this catalyst, a reduction catalyst was produced in the same manner as in Example 39 except that an aqueous triethanolamine solution (50-wt % aqueous solution, $CO_2$-saturated absorbent solution) was used as the electrolyte solution, and the $CO_2$ reduction performance was evaluated by the above-described method.

Comparative Example 12

A catalyst containing no spacer organic molecule, metal fine particle or modified organic molecule was produced in the same manner as in Comparative Example 1. Using this catalyst, a reduction catalyst was produced in the same manner as in Example 39 except that a 90% aqueous 1-ethyl-3-methylimidazolium tetrafluoroborate solution (EMIBF4, $CO_2$-saturated absorbent solution) was used as the electrolyte solution, and the $CO_2$ reduction performance was evaluated by the above-described method.

The evaluation results of Examples 39 to 41 and Comparative Examples 11 and 12 are shown in Table 4. For reference, Table 4 also shows the results of Comparative Example 1.

TABLE 4

| | Material of spacer layer/ Material of organic layer | Electrolyte solution | Selectivity (%) | | | | | | |
|---|---|---|---|---|---|---|---|---|---|
| | | | Carbon monoxide | Formic acid | Formaldehyde | Methanol | Acetic acid | Acetaldehyde | Ethanol |
| Example 39 | 5,5'-bis(mercaptomethyl)-2,2'-bipyridine | 5% aqueous $NaHCO_3$ solution | 3 | 2 | 1 | 2 | 1 | 2 | 1 |
| Example 40 | 5,5'-bis(mercaptomethyl)-2,2'-bipyridine | 50% aqueous triethanolamine solution | 3 | 1 | 1 | 2 | 2 | 1 | 2 |
| Example 41 | 5,5'-bis(mercaptomethyl)-2,2'-bipyridine | 90% aqueous EMIBF4 solution | 2 | 1 | 2 | 1 | 1 | 2 | 1 |
| Comparative Example 1 | — | 5% aqueous $NaHCO_3$ solution | 40 | 0 | 0 | 0 | 0 | 0 | 0 |
| Comparative Example 11 | — | 50% aqueous triethanolamine solution | 40 | 0 | 0 | 0 | 0 | 0 | 0 |
| Comparative Example 12 | — | 90% aqueous EMIBF4 solution | 40 | 0 | 0 | 0 | 0 | 0 | 0 |

| | Material of spacer layer/ Material of organic layer | Electrolyte solution | Selectivity (%) | | | | CO2 reducton rate |
|---|---|---|---|---|---|---|---|
| | | | Oxalic acid | Glycolic acid | Glycolaldehyde | Ethylene glycol | |
| Example 39 | 5,5'-bis(mercaptomethyl)-2,2'-bipyridine | 5% aqueous $NaHCO_{32}$ solution | 1 | 1 | 1 | 53 | 68 |
| Example 40 | 5,5'-bis(mercaptomethyl)-2,2'-bipyridine | 50% aqueous triethanolamine solution | 1 | 1 | 1 | 55 | 70 |
| Example 41 | 5,5'-bis(mercaptomethyl)-2,2'-bipyridine | 90% aqueous EMIBF4 solution | 1 | 1 | 1 | 60 | 73 |

TABLE 4-continued

| | | | | | | | |
|---|---|---|---|---|---|---|---|
| Comparative Example 1 | — | 5% aqueous NaHCO$_3$ solution | 0 | 0 | 0 | 0 | 30 |
| Comparative Example 11 | — | 50% aqueous triethanolamine solution | 0 | 0 | 0 | 0 | 35 |
| Comparative Example 12 | — | 90% aqueous EMIBF4 solution | 0 | 0 | 0 | 0 | 38 |

In all of Examples 39 to 41, high $CO_2$ reduction performance was attained with high selectivity for ethylene glycol production. From Example 41, it was shown that the catalyst exhibits high $CO_2$ reduction performance when an ionic aqueous solution is used.

Example 42

A $CO_2$ reduction catalyst was produced In the same manner as in Example 23, except that the substrate of a multi-Junction solar cell base was used as the charge collector and 5,5'-bis(mercaptomethyl)-2,2'-bipyridinium bromide was used as the spacer organic molecules and organic modified molecules.

On the oxidation electrode layer surface of this multi-junction solar cell, an oxidation catalyst layer was formed.

Next, nickel oxide nanoparticles were dispersed in an aqueous alcohol solution, and the oxidation electrode layer 18 of the multi-junction solar cell was coated with this solution by spray coating to form the oxidation catalyst layer 19. The thus obtained photochemical cell was cut out in a size of 150 mm×250 mm.

Comparative Example 13

A reduction catalyst containing no spacer organic molecule, metal fine particle or modified organic molecule was produced using the substrate of a multi-junction solar cell base was used as a charge collector.

On the oxidation electrode layer surface of this multi-Junction solar cell, an oxidation catalyst layer was formed.

Next, nickel oxide nanoparticles were dispersed in an aqueous alcohol solution, and the oxidation electrode layer 18 of the multi-junction solar cell was coated with this solution by spray coating to form the oxidation catalyst layer 19. The thus obtained photochemical cell was cut out in a size of 150 mm×250 mm.

(Measurement of Energy Conversion Efficiency)

The photochemical reaction cells of Example 42 and Comparative Example 13 were each integrated into a photochemical reactor and the $CO_2$ reduction efficiency was evaluated. A 0.5 M aqueous potassium hydroxide (KOH) solution and an aqueous triethanolamine solution (50-wt % aqueous solution, $CO_2$-saturated absorbent solution) were used as the electrolyte solutions on the oxidation side and the reduction side, respectively. Further, an anion exchange resin was used as an ion exchange membrane. Light emitted by a solar simulator at AM 1.5 (100 mW/cm$^2$) was irradiated to each photochemical reactor from the side of the oxidation catalyst layer 19, and the CO gas generated on the reduction side was quantitatively analyzed by gas chromatography. Based on the results thereof, the energy conversion efficiency (efficiency determined using the irradiated solar energy as a denominator and the Gibbs free energy of a generated substance as a numerator) was determined. The energy conversion efficiency was calculated using the following Formula (5):

$$FE/SE \times 100 \quad (5)$$

In the Formula (5), SE represents the irradiated solar energy, and FE represents the Gibbs free energy of the reduction product.

The measurement results are shown in Table 5.

TABLE 5

| | Material of spacer layer/ Material of organic layer | Average particle size of metal fine particles (nm) | Energy conversion efficiency (%) |
|---|---|---|---|
| Example 42 | 5,5'-bis(mercaptomethyl)-2,2'-bipyridine | 3 | 0.04 |
| Comparative Example 13 | — | — | 0.01 |

[Evaluation of Energy Conversion Efficiency]

When the $CO_2$ reduction catalyst produced in Comparative Example 13 was applied to a photochemical reactor, the photochemical reactor had an energy conversion efficiency of 0.01%. In contrast, when the $CO_2$ reduction catalyst produced in Example 38 was applied to a photochemical reactor, the energy conversion efficiency was 0.04%, which was higher than that of Comparative Example 13. The $CO_2$ reduction catalyst produced in Example 42 was capable of selectively allowing the $CO_2$ reduction reaction to proceed with a low energy, and this $CO_2$ reduction catalyst was effective even with light energy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the invention.

The invention claimed is:

1. A reduction catalyst comprising:
a conductor; and
an organic layer comprises organic modifying groups on a surface of said conductor,
wherein said organic modifying groups contain a structure represented by the following Formula (A):

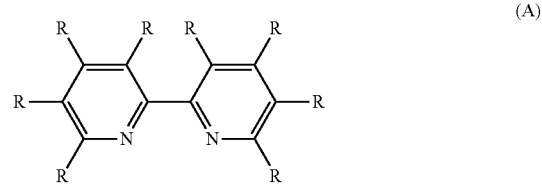

wherein, Rs each independently represent a group selected from the group consisting of hydrogen, hydrocarbon groups having 1 to 6 carbon atoms and heterohydrocarbon groups having 0 to 6 carbon atoms, two of which Rs optionally bind with each other via a hydrocarbon chain having 1 to 6 carbon atoms to form a cyclic structure; and at least one of said Rs is a heterohydrocarbon group, allowing said organic modifying groups to have a group capable of binding to said conductor via a heteroatom contained in said heterohydrocarbon group.

2. The reduction catalyst according to claim 1, wherein said nitrogen-containing heterocycle is a pyridine ring.

3. The reduction catalyst according to claim 1, wherein said heteroatom is a sulfur atom.

4. The reduction catalyst according to claim 1, wherein said organic modifying group comprises a structure represented by any one of the following Formulae (A-1) to (A-4):

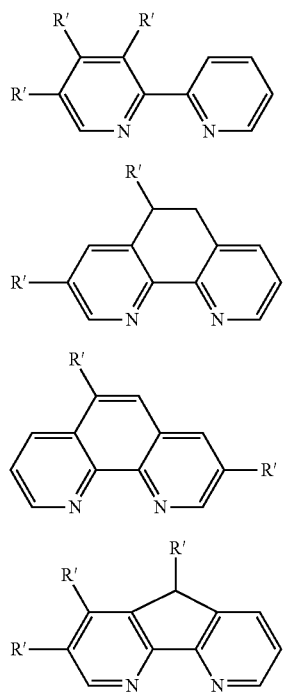

(wherein, R's each represent a group selected from the group consisting of —H, —CH$_3$, —CH$_2$—SH, —CH$_2$—S=SH, —CH$_2$—S—; and —CH$_2$—S=S—; and at least one of said R's is —CH$_2$—S— or —CH$_2$—S=S—, allowing said organic modifying groups to bind to said conductor via said —CH$_2$—S— or —CH$_2$—S=S—).

5. The reduction catalyst according to claim 1, wherein said conductor comprises a metal selected from the group consisting of Au, Ag, Cu, Pt, Pd, Zn, Fe, Ti, Sn, In, Hg, Bi and Ni.

6. The reduction catalyst according to claim 1, wherein said conductor comprises an oxide selected from the group consisting of Ag$_2$O, CuO, Ta$_2$O$_5$, TiO$_2$, ZrO$_2$, Al$_2$O$_3$, SiO$_2$, ZnO, Indium tin oxide (ITO) and F-doped tin oxide (FTO).

7. The reduction catalyst according to claim 1, wherein said conductor comprises metal fine particles, and
said metal fine particles are supported on a spacer layer which is formed on a surface of a conductive substrate and comprises an organic substance.

8. The reduction catalyst according to claim 1, wherein said organic modifying groups is formed from a precursor selected from the group consisting of:
5,5'-bis(mercaptomethyl)-2,2'-bipyridine,
4,5'-bis(mercaptomethyl)-2,2'-bipyridine,
3,5'-bis(mercaptomethyl)-2,2'-bipyridine,
5-(mercaptomethyl)-5'-(mercaptoethyl)-2,2'-bipyridine,
5-(mercaptomethyl)-4'-(mercaptoethyl)-2,2'-bipyridine,
4-(mercaptomethyl)-5'-(mercaptoethyl)-2,2'-bipyridine,
5,5'-bis(mercaptoethyl)-2,2'-bipyridine,
5,5'-bis(mercaptopropyl)-2,2'-bipyridine,
5-(mercaptomethyl)- 5'-(mercaptopropyl)-2,2'-bipyridine,
5-(mercaptopropyl)- 5'-(mercaptoethyl)-2,2'-bipyridine,
5,5'-bis(mercaptomethyl)-2,2'-bipyridine,
3,8'-bis(mercaptomethyl)-1,10'-phenanthroline,
3,8'-bis(mercaptomethyl)-5,6-1,10'-phenanthroline,
2,5'-bis(mercaptomethyl)-5-methyl-5H-cyclopenta[2,1-b:3,4-b']dipyridine,
1,2-bis((3-mercaptomethyl)-2-pyridyl)-1-methyl-ethane,
4,4'-bis(mercaptomethyl)-2,2'-bipyridine,
3,8'-bis(mercaptomethyl)-1,10'-phenanthroline,
3,8'-bis(mercaptomethyl)-5,6-dihydro-1,10'-phenanthroline,
2,5'-bis(mercaptomethyl)-5-methyl-5H-cyclopenta[2,1-b:3,4-b']dipyridine, and
1,2-bis((3-mercaptomethyl)-2-pyridyl)-1-methyl-ethane.

9. A reduction method comprising the steps of:
bringing a reduction electrode comprising the reduction catalyst according to claim 1 into contact with an electrolyte solution; and
introducing a low-molecular-weight carbon compound to said electrolyte solution so as to reduce the thus introduced low-molecular-weight carbon compound using said electrode.

10. The reduction method according to claim 9, wherein said low-molecular-weight carbon compound is selected from the group consisting of carbon dioxide, oxalic acid, glyoxylic acid and glycolaldehyde.

11. The reduction method according to claim 9, wherein ethylene glycol is produced by said reduction method.

12. A reduction reactor comprising:
an oxidation electrode;
a reduction electrode comprising the reduction catalyst according to claim 1; and
a power supply element connected to said oxidation electrode and said reduction electrode.

13. The reduction reactor according to claim 12, wherein said power supply element comprises a semiconductor layer which performs charge separation with light energy.

14. The reduction reactor according to claim 13, wherein said semiconductor layer is formed between said oxidation electrode and said reduction electrode.

* * * * *